(12) United States Patent
Sizemore, Jr.

(10) Patent No.: US 12,545,368 B2
(45) Date of Patent: Feb. 10, 2026

(54) EXTENDABLE RELEASABLY AFFIXED SHADE APPARATUS CLAMP AND BRACKET SYSTEM

(71) Applicant: Jerry T. Sizemore, Jr., Townville, SC (US)

(72) Inventor: Jerry T. Sizemore, Jr., Townville, SC (US)

(*) Notice: Subject to any disclaimer, the term of this patent is extended or adjusted under 35 U.S.C. 154(b) by 679 days.

(21) Appl. No.: 17/868,892

(22) Filed: Jul. 20, 2022

(65) Prior Publication Data

US 2023/0027325 A1    Jan. 26, 2023

Related U.S. Application Data

(60) Provisional application No. 63/224,059, filed on Jul. 21, 2021.

(51) Int. Cl.
*B63B 17/02*  (2006.01)
*F16L 3/00*   (2006.01)
(Continued)

(52) U.S. Cl.
CPC .......... B63B 17/02 (2013.01); *F16L 3/00* (2013.01); *F16L 21/00* (2013.01); *F16L 23/00* (2013.01); *B63B 2017/0054* (2013.01)

(58) Field of Classification Search
CPC .......... B63B 17/00; B63B 17/02; B63B 2017/0054; F16L 17/00; F16L 17/02; F16L 17/04; F16L 21/00; F16L 21/02; F16L 21/06; F16L 21/065; F16L 23/00; F16L 3/00; F16L 3/10; F16L 3/1075
(Continued)

(56) References Cited

U.S. PATENT DOCUMENTS 4,492,175 A   1/1985   Johnson
4,639,979 A * 2/1987   Polson ................. F16B 7/1418
                                              24/273
(Continued)

FOREIGN PATENT DOCUMENTS

CA    2818008 C    11/2015
DE    2348796 A1    4/1975
(Continued)

OTHER PUBLICATIONS

SEAEQ, Sailboat Sun Awning WS 350, https://www.nauticexpo.com/prod/seaeq/product-61989-544269.html, 2021.
(Continued)

*Primary Examiner* — Lars A Olson
(74) *Attorney, Agent, or Firm* — Offit Kurman; Douglas L. Lineberry

(57) ABSTRACT

Described herein are improved clamping and bracket systems and methods of using and installing same to enable, in one embodiment, a sailing vessel to deploy a sunshade, solar cell, or other surface from a boom-mounted clamp and bracket system wherein the clamp and bracket system does not impede boom or running rigging operation and allows for changing the horizontal position of the bracket system to reposition the sunshade, solar cell or surface, without unfastening or loosening the clamp(s) once installed, all without piercing, drilling into, or otherwise damaging the boom.

18 Claims, 25 Drawing Sheets

(51) Int. Cl.
*F16L 21/00* (2006.01)
*F16L 23/00* (2006.01)
*B63B 17/00* (2006.01)

(58) Field of Classification Search
USPC ....................................................... 114/39.21
See application file for complete search history.

(56) References Cited

U.S. PATENT DOCUMENTS

| | | | |
|---|---|---|---|
| 5,522,413 A | 6/1996 | Kuwahara | |
| 6,439,150 B1 | 8/2002 | Murphy | |
| 7,367,276 B2* | 5/2008 | Ashdown | B63H 9/06 |
| | | | 114/89 |
| 7,395,774 B2 | 7/2008 | Borges | |
| 7,685,960 B1 | 3/2010 | Carusello | |
| 9,139,258 B2 | 9/2015 | Russikoff | |
| 9,194,516 B2* | 11/2015 | Beagen, Jr. | F16L 21/065 |
| 9,915,386 B2* | 3/2018 | Lee | F16L 21/06 |
| 10,604,214 B2 | 3/2020 | Jesewitz | |
| 2014/0299035 A1 | 10/2014 | Schiarini | |
| 2019/0300125 A1 | 10/2019 | Booher | |

FOREIGN PATENT DOCUMENTS

| | | |
|---|---|---|
| GB | 2273470 A | 6/1994 |
| GB | 2457255 A | 8/2009 |
| WO | WO2012076945 | 6/2012 |

OTHER PUBLICATIONS

EVAL, Sailboat Sun Awning 04404 series, https://www.nauticexpo.com/prod/eval/product-23586-217469.html, 2021.

* cited by examiner

EXTENDABLE RELEASABLY AFFIXED SHADE APPARATUS CLAMP AND BRACKET SYSTEM

TECHNICAL FIELD

The subject matter disclosed herein is generally directed to improved clamping and bracket systems and methods of using and installing same to enable, in one embodiment, a sailing vessel to deploy a sunshade, solar cell, or other surface from a boom-mounted clamp and bracket system wherein the clamp and bracket system does not impede boom or running rigging operation and allows for changing the horizontal position of the bracket system to reposition the sunshade, solar cell or surface, without unfastening or loosening the clamp(s) once installed, all without piercing, drilling into, or otherwise damaging the boom.

BACKGROUND

Outdoor activities, such as boating, camping, RVing, etc., often take place in sunny areas. Boating, especially, involves high sun exposure as there are no surrounding ground features to provide shade such as trees, structures, etc.

Past efforts to provide boaters with shade have been attempted but lack various necessary features or have been designed by use on boats and vessels by those who lack knowledge of the actual function of boats and vessels. For instance, CA2818009C, Retractable Sailboat Canopy, Shade/Rain Protection Device by Kelly et al. ("Kelly '009"), discloses a retractable shade/rain protective canopy cover, attached to the side of a sailboat boom that can easily be extended to an open position and quickly retracted to a compact rolled position when not needed. (Abstract.)

The apparatus can either be attached to one side of the boom or be attached as a pair to each side of the boom to provide an even larger area for sun/rain protection over a sailboat cockpit area. It can be positioned anywhere along the boom length including cantilevering the structure beyond the end of the boom to provide the maximum sun/rain protection desired. The apparatus can be attached to any size boom with the use of screws or clamps wrapped around the boom if the preference is not to have permanent holes in the boom structure. An internal tension spring mechanism keeps the fabric taut when in the extended position and pulls the fabric back to a rolled retracted position. The result is a practical sun/shade device than can be extended while sailing or stationary at anchor and can be quickly retracted to a rolled position when not needed. (Abstract.)

However, there are several critical failings with Kelly '009. Foremost, the product is limited to only providing shade and is practically infeasible to install on a vessel. As Kelly '009 explains, the device requires affixing a piece of C-channel to the sides of the boom in a linear fashion by drilling holes through the boom and C-channels, then attaching the two C-channels to "sandwich" the boom by inserting screws or bolts through the holes in both C-channels and the boom and then wrapping hose clamps around the boom and C-channels to hold either one or two C-channels together.

However, the Kelly '009 structure ignores the presence of "running rigging" on the vessel such as ropes, lines, main sheet, pulleys, cam cleats, eyelets, etc. Not only is this running rigging permanently attached to the vessel, but they must be allowed to move and operate as the vessel sails and/or holds position. Further, running rigging is associated not only with the external surface of the boom, but run inside the interior of the boom as well. Thus, the Kelly '009 construct covers and clamps down upon various running rigging facets. This, critically, prevents operation of the vessel, whether moving or stationary, as running rigging "runs" both along the outside of the boom as within its interior. FIG. 1 shows an outward view of the Kelly '09 and FIG. 2 shows a close up view with element 24 representing the hose clamps that impede the running rigging. Critically, the hose clamps completely encircle and tightly enclose the boom. This covers the open slug/main sheet track preventing the sheet from traveling the track, thereby preventing one from moving the sheet and thus impeding operation of the vessel.

Further, even if preventing operation of the vessel was not cumbersome enough, installation of the Kelly '009 device will run screws into the boom, which has internal components necessary to operation of the vessel's running rigging. Protruding screws entering the boom will grab, puncture, and cut the ropes, lines, and running rigging, inside the boom as well as that running along the outer surface that constantly rub against the outer surface of the boom. Recall, the running rigging is in nigh constant motion, unless the vessel is completely still and becalmed, a very rare situation when a vessel is on any sizable body of water, and an impossible occurrence when the vessel is moving. The Kelly '009 device interferes with and covers the running rigging. This literally interferes with the "life lines" of the vessel and prevents the user from operating ropes, lines, running rigging, etc., which are needed unimpeded at all times and must remain in stable condition and undamaged, not dragging across exposed screw ends, head or bodies. Indeed, the Kelly '009 device due to its installation requiring C-Channel to cover the boom's running rigging, i.e., the steering/control mechanisms of the vessel, and blocks the sails "slug" track. For comparison purposes, such changes made to a car would be like locking or removing control of the steering wheel, gearshift lever, gas pedal and brake pedal of the vehicle. Further, introduction of the Kelly '009 device will result in fatigue and failure of the running rigging, which contravenes the United States Coast Guard's Navigation and Vessel Inspection "NVIC" Circular No. 02-16 COMPDTPUB P16700.4 Codes 46 CFR 176.802 (a)(3), 115.802 (a)(3), and 169.309, etc. Indeed the Coast Guard states "Sailing vessels and their rigging are made up of a complex system that must stay intact and function properly else risk catastrophic failure that could result in a significant marine casualty." Commandant, United States Coast Guard.

Additionally, the Kelly '009 device is cumbersome to reposition along the boom. The C-channels and hose clamps must all be removed and repositioned along the boom to change the position of the Kelly '009 relative to the length of the boom. Further, the Kelly '009 device requires expensive, heavy, highly machined parts and components that will create a very heavy shade apparatus. Indeed, substantial weight affixed to the boom may cause failure of the gooseneck of the vessel as the Kelly '009 would cantilever a significant weight far out along the boom with respect to the gooseneck, which may loosen rivets and fittings and possibly snap the gooseneck at the joint where the boom affixes to the mast. A catastrophic failure that would destroy the main sail.

GB2273470A provides a boom tent assembly for protecting a yacht or similar vessel from sun or rain comprises an elongate housing 4, attached to a boom 2, for receiving and storing an awning 18. The awning 18 is furled around a shaft 14, which is rotateably mounted in bearings retained within the housing. The awning is unfurled by pulling on its free end, which is then fastened to suitable supports. The awning may he rewound into the housing by pulling on a line 20, also attached to the shaft 14, the awning and line being wound around the shaft in opposite directions. (Abstract.) This assembly, too, affixes to the boom and would interfere with the operation of the running rigging, as well as prevent movement of the boom while the device is in use.

Other attempts such as US20140299035 by Maurizio et al., provides a method and kit to fit an awning onto a sailboat. WO2012076945 by Belloni, et al., provides a sailing vessel (1) comprising a hull (2), at least a mast (3) associated with the hull (2) and supporting at least a sail (4) and one or more on-board electrical units, wherein the sail (4) comprises at least a first supporting element (6) in fabric and one or more flexible first photovoltaic panels (7*a*) integrally associated with the first supporting element (6) and operatively connected to at least one electrical unit. (Abstract.)

Further, U.S. Pat. No. 4,492,175, Johnson et al., provides a watercraft such as a sailboat, wherein a boom is pivotally mounted to a mast and extends aft over an open cockpit, a plurality of fittings are mounted to the port and the starboard sides of the boom in a spaced apart manner. Elongate spreader members are removably carried by such fittings and they extend laterally outward over the open cockpit, terminating above the port and starboard sides of the cockpit. Flexible membranes are supported on the spreaders and flexible screening depends from the outboard edges of the membranes in such a manner that the screening surrounds the cockpit and the lower edge of the screening is held in place against the hull structure of said watercraft. (Abstract.) This device also drills through the boom and impinges operation of the vessel while the device is employed.

Other attempts provide devices that drape over and secure to the port and starboard sections of the craft, such as seaEQ, shown as FIG. 3. Further attempts include U.S. Pat. No. 6,439,150 by Michael et al., that provides a shade cover assembly that fits over the cockpit of the craft. See FIG. 4. GB 2457255A, Herbert et al., provides a canopy with integrated solar cells for use over the cockpit of a vessel. U.S. Pat. No. 9,139,258 provides a pullout shade system for a vessel that mounts to overhead structures on a boat or vessel and comprises a set of tubular actuator assemblies. U.S. Pat. No. 7,395,774, Borges et al., provides a retractable canopy structure adapted to be used in conjunction with the canopy structure on a boat's existing T-top tubular frame near the level of the existing canopy. (Abstract.) DE 2348796A1, Trempeck et al., provides a sun awning for a vessel that installs a rail system onto the deck of a vessel. See FIG. 5.

Citation or identification of any document in this application is not an admission that such a document is available as prior art to the present disclosure.

SUMMARY

The above objectives are accomplished according to the present disclosure by providing in one aspect a non-interfering clamp. The non-interfering clamp may include a clamp body comprising a first clamping portion and a second clamping portion, wherein the first clamping portion and second clamping portion may combine to define a clamp passage within the clamp body, the non-interfering clamp may be configured to have an open configuration and a closed configuration and to reversibly move between the open configuration and the closed configuration via separating the first clamping portion and second clamping portion from one another and rejoining the first clamping portion and the second clamping portion; and the clamp body may define an opening for insertion of a clamp retainer configured to cause the first clamping portion and the second clamping portion to move toward one another and tighten into the closed configuration. Further, the clamp passage may define at least one side passage defined from the clamp passage. Still yet, when the non-interfering clamp is engaged with a structure, the at least one side passage may remain open and unobstructed. Moreover, at least one clamp compression unit may be placed on an inner surface of the non-interfering clamp. Again, at least one hinge may join the first clamping portion to the second clamping portion. Still further, the clamp may include an inner perimeter angled inward with respect to a clamp face of the improved clamp body at least partially surrounding the at least one side passage. Further, the non-interfering clamp may be affixed to a boom of a vessel. Again still, when affixed to the boom rigging may pass through the at least one side passage of the non-interfering clamp.

In a further aspect, the disclosure provides a method for affixing a non-interfering clamp to a boat structure. The method may include placing a non-interfering clamp adjacent to a boom on a boat in an open configuration. The non-interfering clamp may include a clamp body comprising a first clamping portion and a second clamping portion, the first clamping portion and second clamping portion may combine to define a clamp passage within the clamp body, the non-interfering clamp may be configured to have the open configuration and a closed configuration and to reversibly move between the open configuration and the closed configuration via separating the first clamping portion and second clamping portion from one another and rejoining the first clamping portion and the second clamping portion, and the clamp body defining an opening for insertion of a clamp retainer configured to cause the first clamping portion and the second clamping portion to move toward one another and tighten into the closed configuration, securing the first clamping portion and the second clamping portion around the boom by closing the clamp passage around the boom to put the clamp in the closed configuration, and tightening the first clamping portion and the second clamping portion to the boom. Further, the method may include engaging rigging within at least one side passage defined from the clamp passage. Still yet, the method may include defining at least one side passage to remain open and unobstructed when the non-interfering clamp is engaged with the boom. Moreover, the method may include engaging the boom with at least one clamp compression unit defined on an inner surface of the non-interfering clamp. Still yet, the method may include configuring the non-interfering clamp to have at least one hinge joining the first clamping portion to the second clamping portion. Further yet, the method may include defining an inner perimeter angled inward with respect to a clamp face of the improved clamp body to at least partially surround the at least one side passage.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which.

Figure 1:
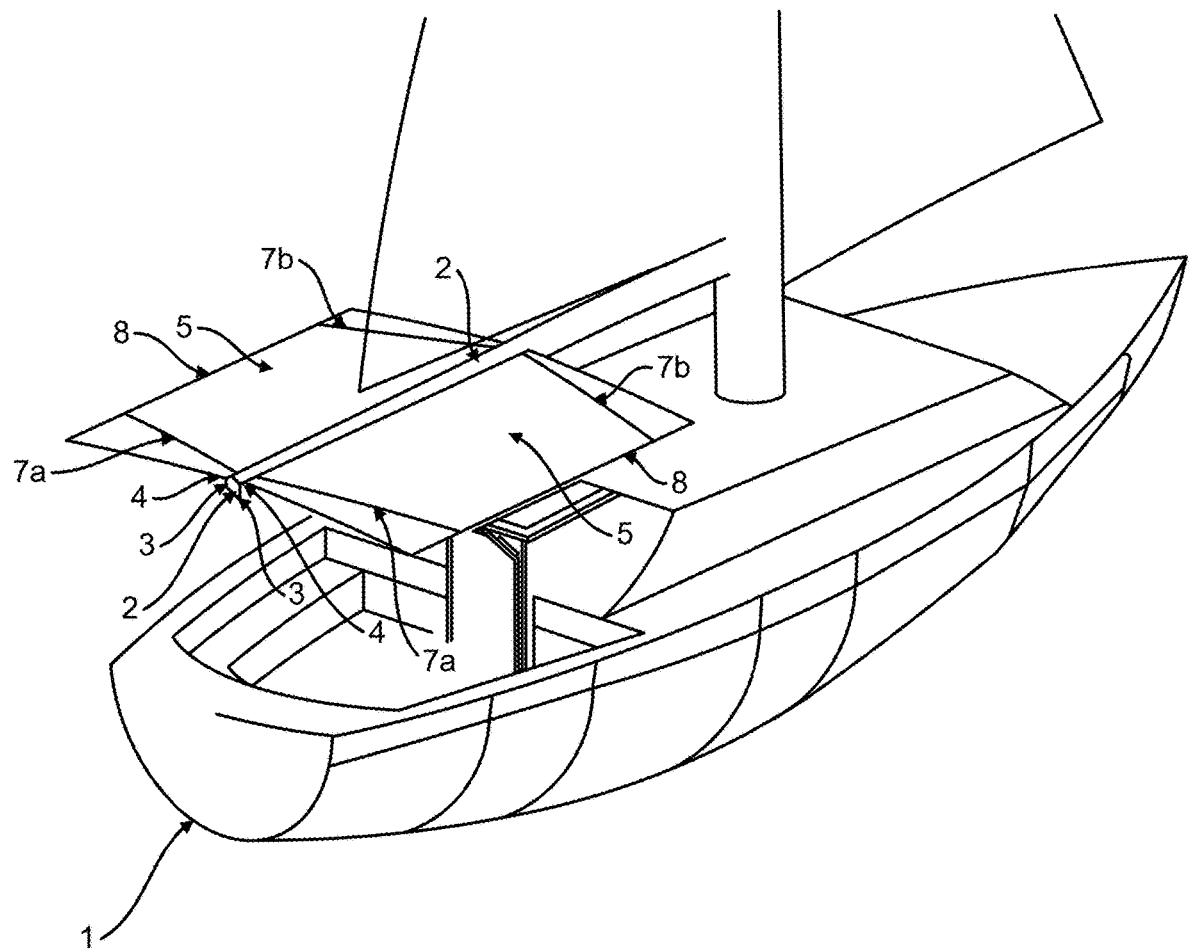
FIG. 1 shows a previous attempt at providing shade on a vessel.
Figure 2:
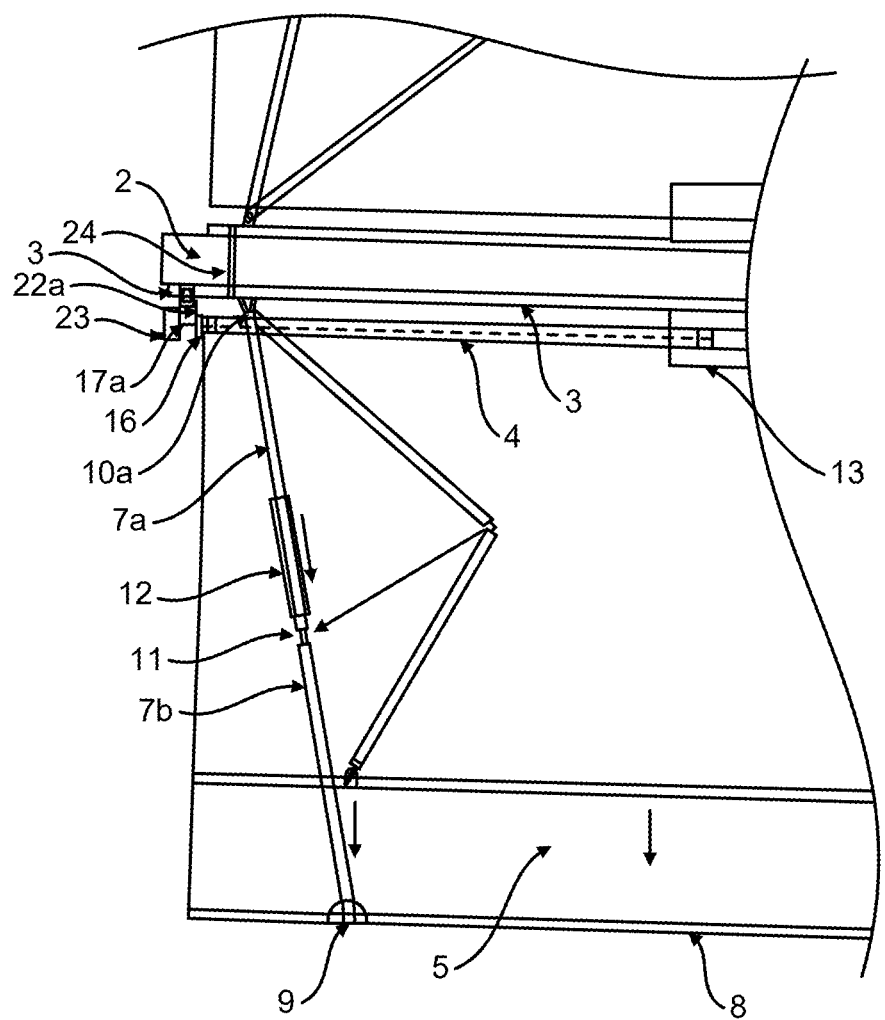
FIG. 2 shows another prior attempt at providing sunshade on a boat.
Figure 3:
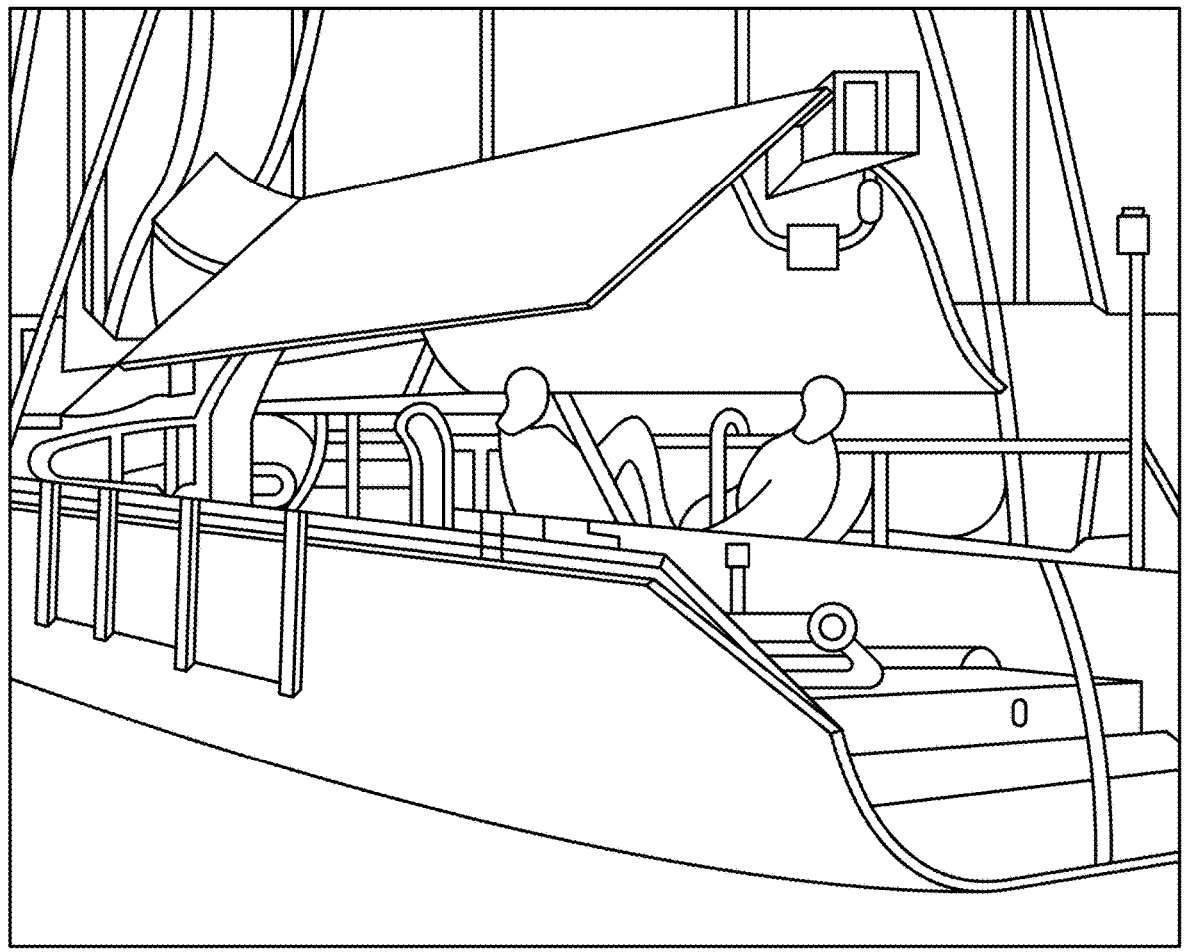
FIG. 3 shows yet another prior attempt to install shade on a vessel.
Figure 4:
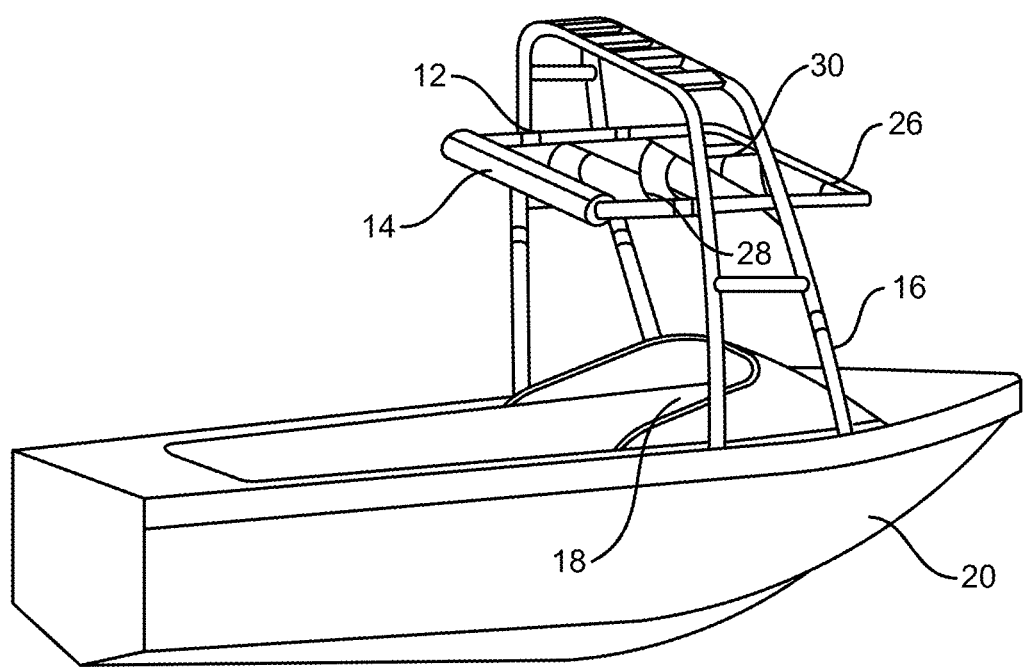
FIG. 4 shows a further prior attempt to provide boat shade.
Figure 5:
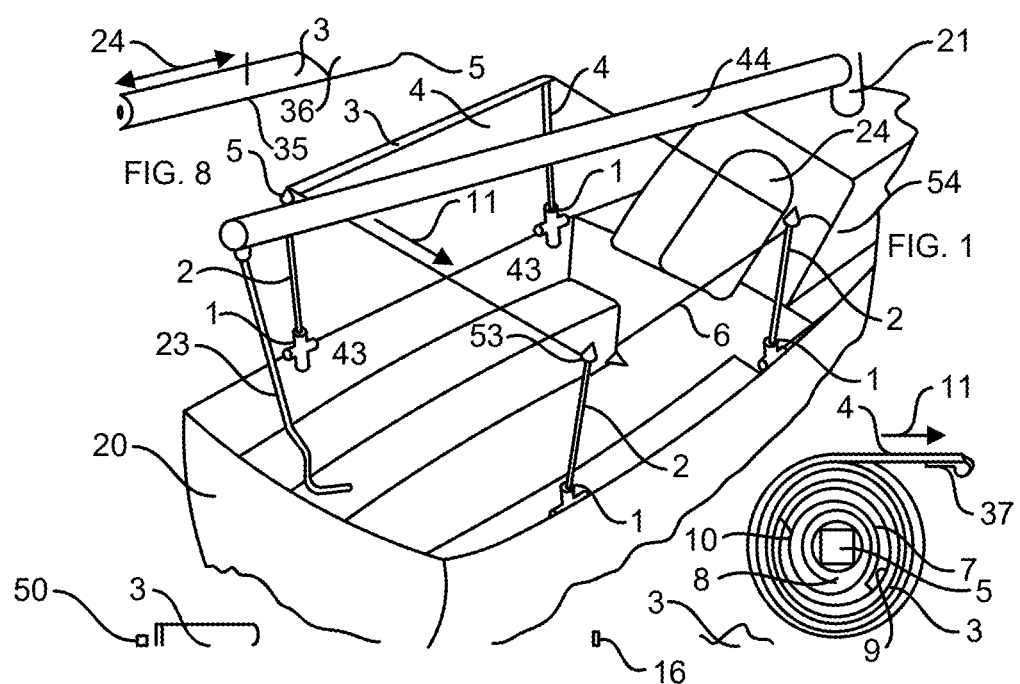
FIG. 5 shows another prior sun shade device for a vessel.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used herein, "tangible medium of expression" refers to a medium that is physically tangible or accessible and is not a mere abstract thought or an unrecorded spoken word. "Tangible medium of expression" includes, but is not limited to, words on a cellulosic or plastic material, or data stored in a suitable computer readable memory form. The data can be stored on a unit device, such as a flash memory or CD-ROM or on a server that can be accessed by a user via, e.g. a web interface.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

Kits

Any of the devices described herein can be presented as a combination kit. As used herein, the terms "combination kit" or "kit of parts" refers to the clamps, rollers, shade material, solar panels, bolts, fasteners, etc., and any additional components that are used to package, sell, market, deliver, and/or provide the combination of elements or a single element, such as the extendable releasably affixed shade apparatus contained therein. Such additional components include, but are not limited to, packaging, blister packages, and the like. The separate kit components can be contained in a single package or in separate packages within the kit.

In some embodiments, the combination kit also includes instructions printed on or otherwise contained in a tangible medium of expression. The instructions can provide information regarding the content of the kit, safety information regarding the content of the kit, information regarding attaching a device of the current disclosure to a vessel or surface. In some embodiments, the instructions can provide directions and protocols for installing and maintenance of the devices disclosed herein including any of the methods described in greater detail elsewhere herein.

An extendable releasably affixed shade apparatus of the current disclosure simply mounts to the boom of a sailboat or other location by using at least one custom clamp. The shade portion of the device unrolls from a housing and can be grabbed and pulled out to affix to safety rails, safety straps, or flexible attachments such as bungee cords attached by a cam cleat style rope brake identical to use on the vessel wherein the device is engaged. The device may be elevated by changing the angle of the shade with respect to the housing by tying off the shade at different angles with respect to the housing. For instance, the shade may have at least 270 degrees of motion allowing for the shade to be affixed at a multitude of angles with respect to the housing containing the shade, such as 0°, essentially extending horizontally from the housing to extending "behind" the housing, either by pulling the shade above the housing or below the housing, allowing the shade to move at least 45° beyond a vertical axis extending through the housing. Indeed, the shade may have a full 360° motion range with respect to the housing, as permitted by the structures on the boat or other vehicle to which the device is attached.

The device may move port to starboard on the vessel, such as by being intentionally moved or accidentally bumped. Indeed, the current disclosure provide for the shade being telescoped to the stern of the vessel to create a "roof" while the shade is deployed. This "roof" provides significant shade, thereby preventing sunburn, possible skin cancer, etc.

Figure 17:
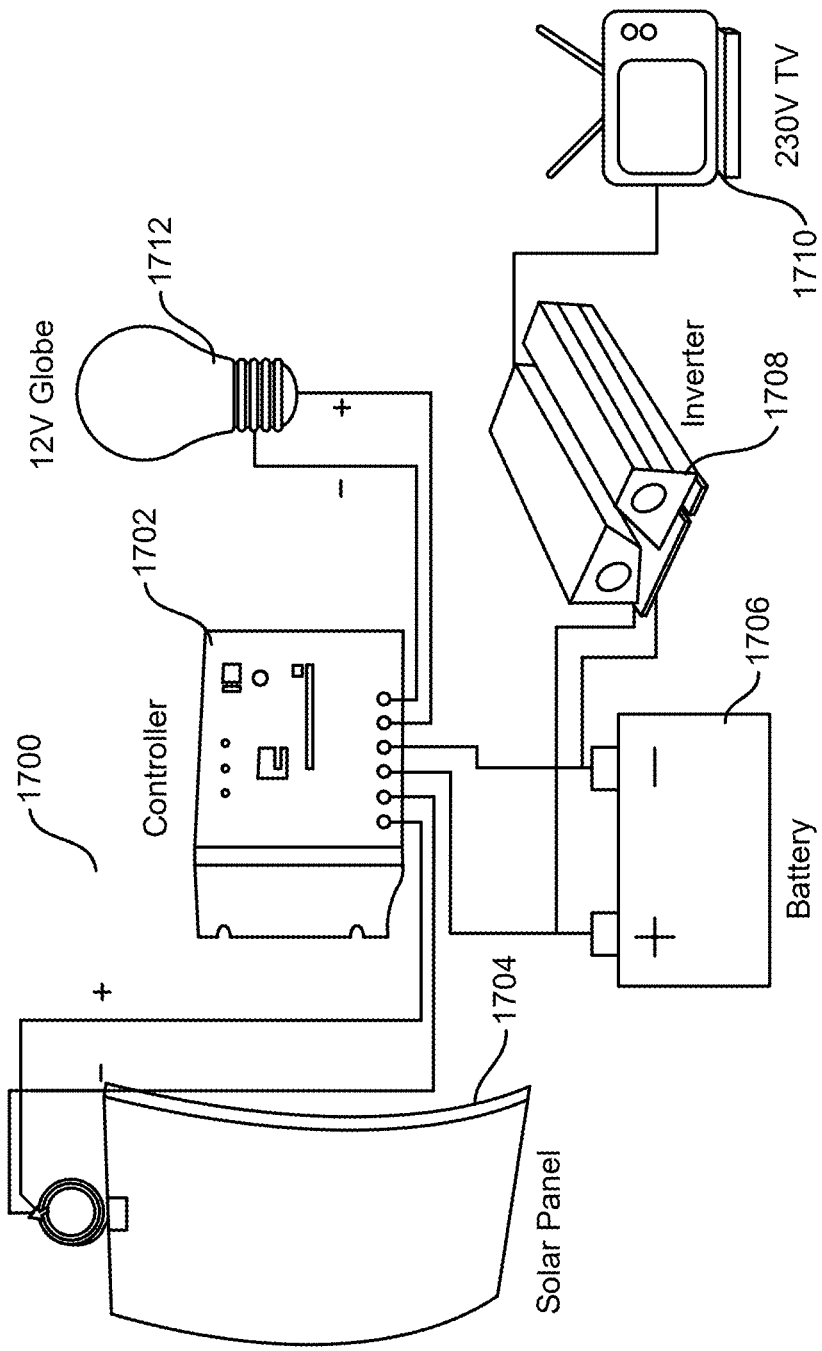
FIG. 17 shows one possible installation set up for solar panels for the current disclosure.

In one embodiment, three devices may be affixed to a boat or other vehicle, such as for instance, affixing two devices to the boom and one device to the mast. This can create up to 50-100 square feet of shade/solar intake on the vessel. One important element of the current device is that the extending shade may be replaced, with either partially or completely with a flexible solar cell. FIG. 17 shows one potential installation set-up 1700 for solar cells that may be implemented with the current disclosure. This includes controller 1702 that may be in electrical communication with solar cell 1704, battery 1706, as well as an inverter 1708 that would direct current to appliances 1710, such as TVs, air conditioners, etc., as well as direct current to lights 1712, etc. Solar cell 1704 may be made from rollable flexible thin films, such as 1.2 Amp Rollable/Portable Solar Panels, 1 W 6V flexible amorphous silicon thin film solar panels, including weather proof solar panels, etc. In one embodiment, solar cells may be wired to basic MC4 cables to one or more batteries on board, then to a charge controller, then to an inverter where appliances, etc., would plug in for usage.

Currently, most vessels average only 9-15 square feet of surface area that may be used as a platform or surface for solar cells. Given the ability to have up to 100 square feet of surface area, the devices of the current disclosure would be able to power onboard batteries, thus, reducing the need for diesel fuel, possibly even eliminating its need and forming a completely electric vehicle.

The ability for the current device to also provide power is important for "blue water cruisers" and even YouTube® personalities, such as S. V. Delos and Sailing Good Bad Ugly who sale from the United States to other countries. These travels often place the travelers at the mercy of unpredictable and, sometimes tainted, fuel sources, not to mention hampered by locales that lack sufficient infrastructure to refuel and replenish sea vessels. Indeed, having to dock at less than reputable ports is a frequent experience with some YouTube® personalities where they may be provided bad fuel, price gouged, or even robbed at some locales.

Based on the square footage provided by the current disclosure and using same with flexible solar cells, electric outboard motors could become the main source of power when wind power is not available. While safety and eco-friendly power are positive side-effects of the current device, cost is also saved. The current disclosure can help sailors avoid bad gas/diesel intake, which quickly damages and/or destroys engines, forcing the sailors to again interact with less than ideal locales to buy cheap/poorly made parts at very high prices to effect repairs, then again having to purchase bad gas/diesel at the locale, creating a vicious cycle for some crews.

One goal of the current disclosure is to provide sufficient free, clean energy to not only enable worldwide travel, but to avoid current issues faced by crews and sailors worldwide. Another valuable aspect of the current disclosure, also couple to the square footage provided by the device, is the ability to use the new surface area for advertising, marketing, social media communications, safety warnings, requests for assistance, etc. At essence, the device provide a billboard and signaling flag all in one. This can be accomplished by employing semi-transparent lettering atop the solar cell. This could include laminated and/or waterproof/weatherproof labels, which can be made from vinyl, plastics, synthetics, nonwovens, meltblowns, etc., employing water-resistant substrates and high quality UV inks that may withstand temperatures from −40° F. to 176° F., such as those available from TUFFLABLES.COM, KSPRINTS.COM, etc. This could allow sailors/crew to display logos such as the New Orleans Saints® from the NFL®, website addresses, YouTube® channel identifiers, Facebook® pages, etc., which can be seen and marketed when the devices are deployed. Indeed, given the versatility of positioning the devices, helicopters, planes, bridges, drones, etc. may all view the message from the top, or the device may rotate the view to provide a typical "billboard" view for those seeing the vessel pass alongside on the water.

Figure 6:
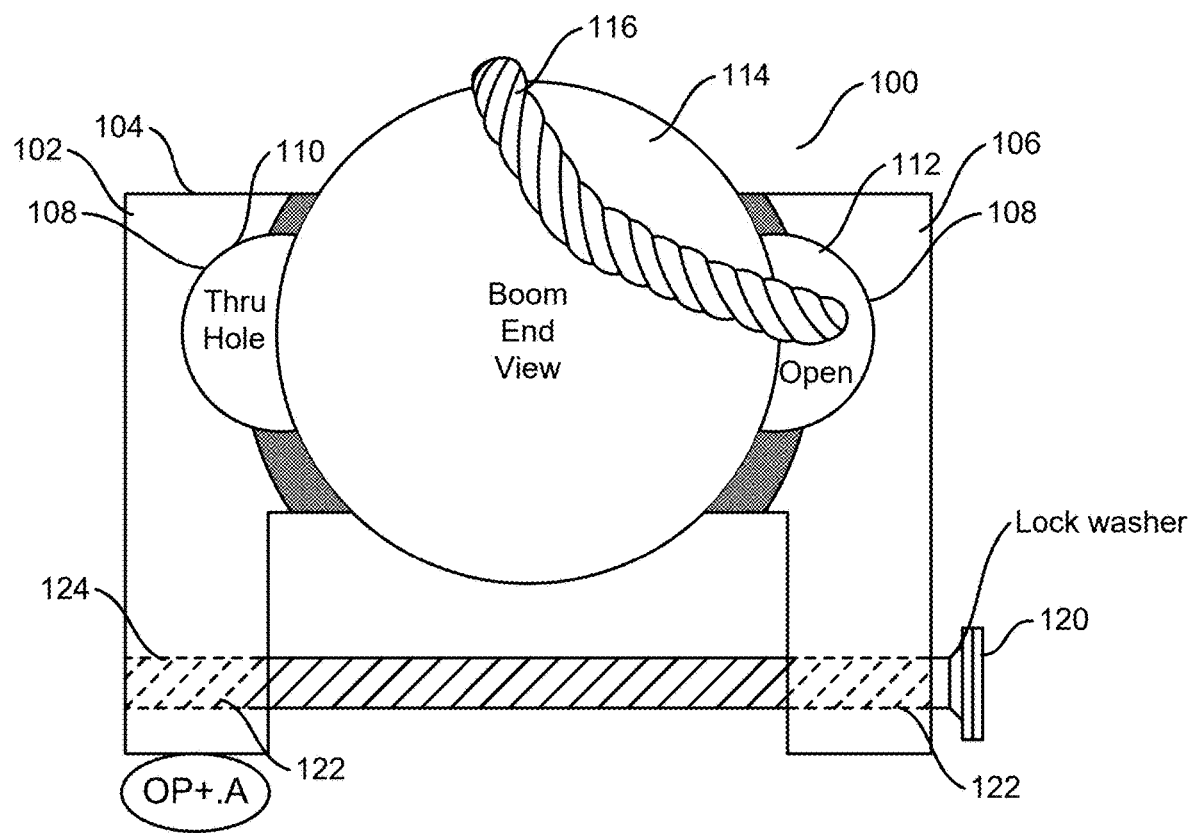
FIG. 6 shows an end-on view of one embodiment of the current disclosure.

FIG. 6 shows one embodiment of open profile boom clamp 100. Clamp body 102 may be formed from a first clamping portion 104 and second clamping portion 106. First clamping portion 104 and second clamping portion 106 may be formed from wood, plastic, synthetics, polymers, 3-D printed materials, metals—such as but not limited to brass, copper, iron, steel, gold, silver. In one embodiment the clamping portions may be formed from wood. Both first clamping portion 104 and second clamping portion 106 may define clamp passage 108 in the interior 110 and 112 of the first and second clamping portions, respectively. Clamp passage 108 may be formed in any particular shape, such as semi-circular, ridged, angular, etc., in order to allow passage of ropes, lines, running, rigging, etc. The clamp openings are designed for the running rigging only due to its importance to vessels. However, where a manufacturer has most or all running rigging located inside of the boom, then the clamp openings may be used for gaff poles, dock poles, etc., so long as the Captain or crew deems this safe/necessary. In one embodiment, clamp passage 108 may be formed in a semi-circular shape in order to provide a smooth surface that will not abrade, hang, or otherwise damage or interfere with running rigging associated with the vessel boom 114, such as rope 116 that is shown passing through clamp passage 108. While both clamp passages 108 are shown as the same shape, the current disclosure is not so limited and clamp passages may mirror one another in appearance or be different in appearance with respect to one another.

First clamping portion 104 and second clamping 106 may include compression units 118, which may be formed from rubber, synthetics, nonwovens, plastics, elastomers, thermoplastics, etc. In one embodiment, compression units 118 may be formed from rubber and are shaped to accommodate the shape of vessel boom 114 to prevent first clamping portion 104 and second clamping portion 106 from damaging vessel boom 114 while attached. Compression units 118 may act as "shock absorbers" between the clamping portion and vessel boom 114 to prevent movement of the clamping portions from damaging or shifting vessel boom 114. First clamping portion 104 and second clamping portion 106 may be joined together via clamp lightener/fastener 120, which passes through fastener passages 122 defined in first and second clamping portions 104 and 106. In one instance lightener/fastener 120 may be a bolt and nut combination, or other connector as known to those of skill in the art, in order to allow the user to both tighten and release first clamping portion 104 and second clamping portion 106 with respect to vessel boom 114. Further, lightener/fastener 120 may be formed to be integral with first clamping portion 104 and second clamping portion 106 so the lightener/fastener 120 remains connected to both pieces to prevent the parts from being separated and lost. However, lightener/fastener 120 may also be formed to separate from both clamping portions.

Further, either first clamping portion 104 or second clamping portion 106 may include fastener retainer 124 that would obviate the use of a nut or other "end piece" for a bolt or other structure used as lightener/fastener. Fastener retainer 124 maybe a threaded hole, a cavity capturing a formed end of lightener/fastener 120 in a male/female relationship, a threaded nut embedded in the respective clamping portion, etc., as known to those of skill in the art. The material for the clamp body may be aluminum or 316 L grade stainless steel. All associated nuts, bolts, and washers (installation hardware) may be 316 L grade stainless steel. In use, tightening lightener/fastener 120 would close first clamping portion 104 and second clamping portion 106 in order for the to fit around vessel boom 114. Loosening lightener/fastener 120 would separate first clamping portion 104 and second clamping portion 106 to allow them to be removed from vessel boom 114.

As FIG. 6 helps illustrate, the clamp and bracket systems disclosed herein all releasably attach to and affix to a boom without piercing, drilling into, or otherwise damaging the boom or adjoining vessel structures. This is beneficial for the boat owner due to its easy on/easy off self-biting clamp attachment saving time and labor while in no way harming the boom or vessel. This may also aid in making repairs, performing maintenance on the boom or running rigging, as well as when cleaning and polishing are needed.

Figure 7:
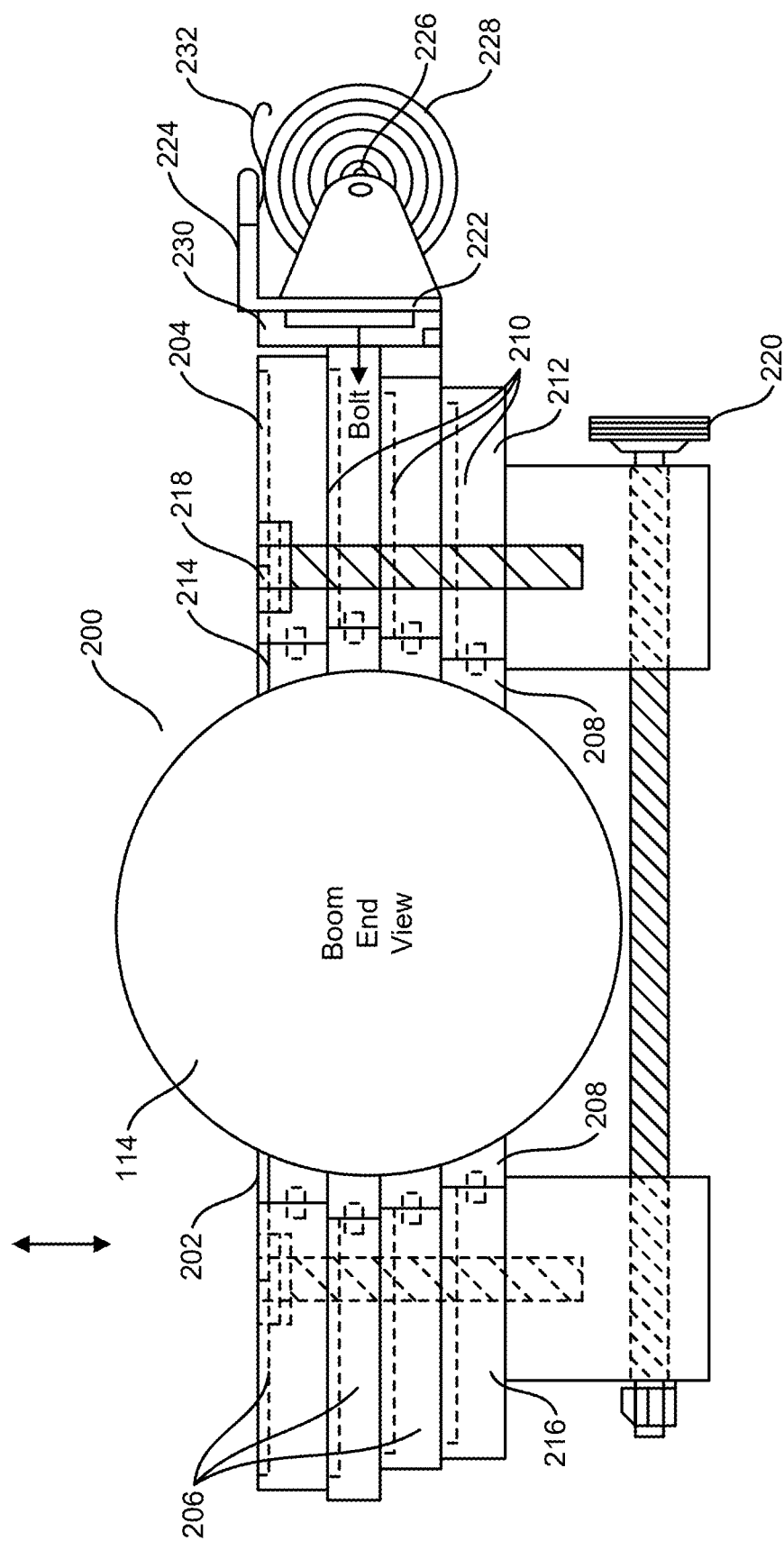
FIG. 7 shows an end-on view of an alternative embodiment of the current disclosure.

FIG. 7 shows an alternative open profile boom clamp 200. In this embodiment, alternative first clamping portion 202 and alternative second clamping portion 204 are formed from at least one, preferably at least two, sliding locks 206. Sliding locks 206 may also comprise alternative compression units 208 to prevent damage to vessel boom 114. Sliding locks 206 may define slotted holes 210 in their interior 212 that allow sliding locks 206 to move toward and away from boom 114 in order to create openings between sliding lock distal end 214 (which may comprise alternative compression unit 208) and boom 114 through which rope, rigging, lines, etc. may pass while still maintaining the remainder of alternative first or second clamping portion with vessel boom 114. Sliding locks 206 may be stacked atop one another to form alternative clamping portion body 216 with sliding locks 206 anchored to one another via a vertical fastener 218, such as a bolt, screw, etc., that may be tightened and loosened to allow for movement of sliding locks 206 via sliding holes 210 moving with respect to vertical fastener 218. Further, different sized openings may be formed within alternative clamping portion body 216 by moving one, two, three, four, or more sliding locks 206 away from contact with vessel boom 114. Indeed, multiple, separate holes of varying sizes may be created by leaving one sliding lock 206 in contact with the boom but sliding one, two, three or more sliding locks 206 adjacent to either side of the sliding lock 206 left in place to form a plurality of different sized holes through which rope, rigging, lines, etc., may pass while the sliding lock 206 left in contact with the boom keeps alternative open boom clamp 200 in place with respect to boom 114. This embodiment may also include alternative lightener/fastener 220 that may function as described in the previous embodiment for lightener/fastener 120.

Figure 18:
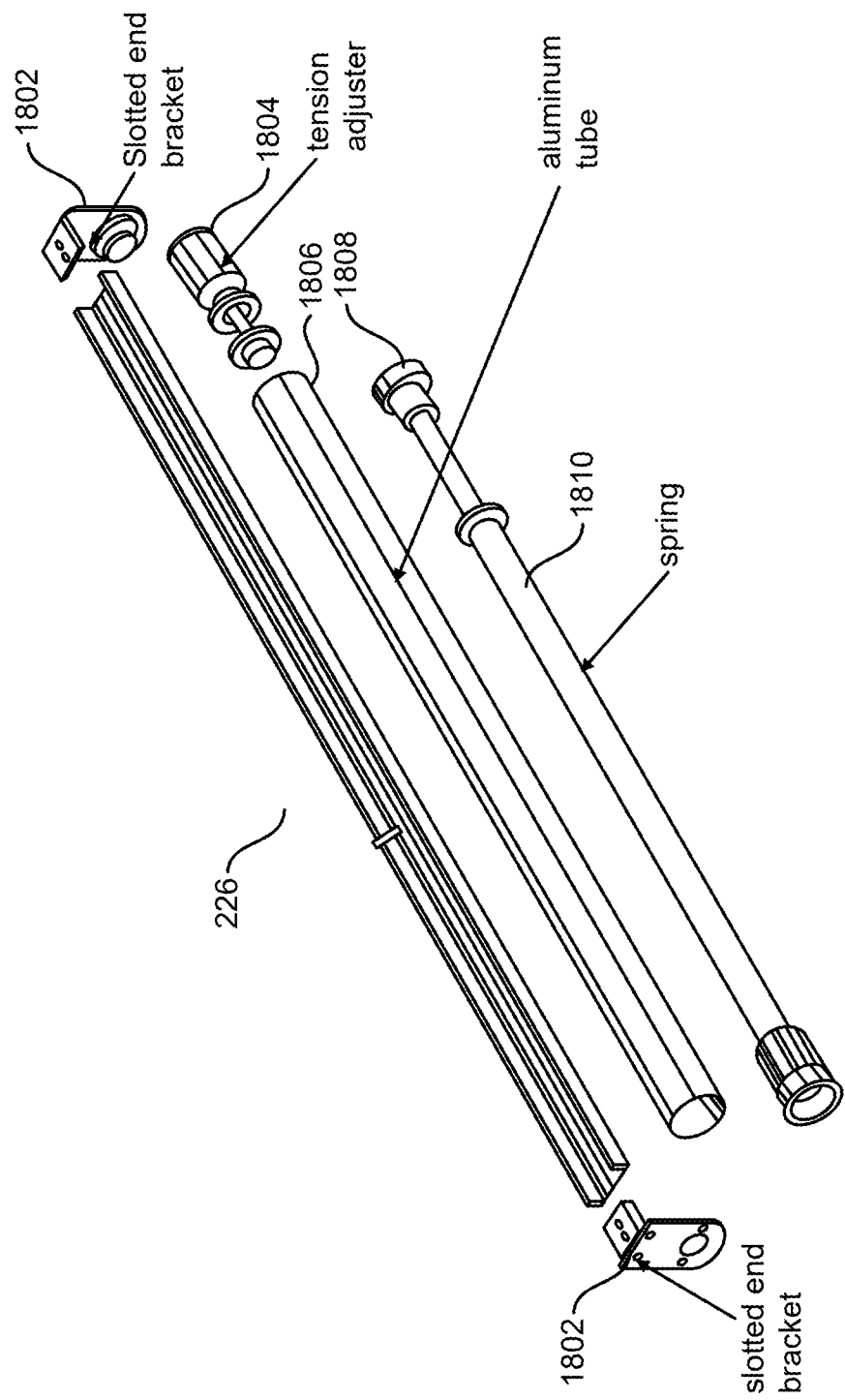
FIG. 18 shows one embodiment of a retractable roller than may be used with the current disclosure.
Figure 19:
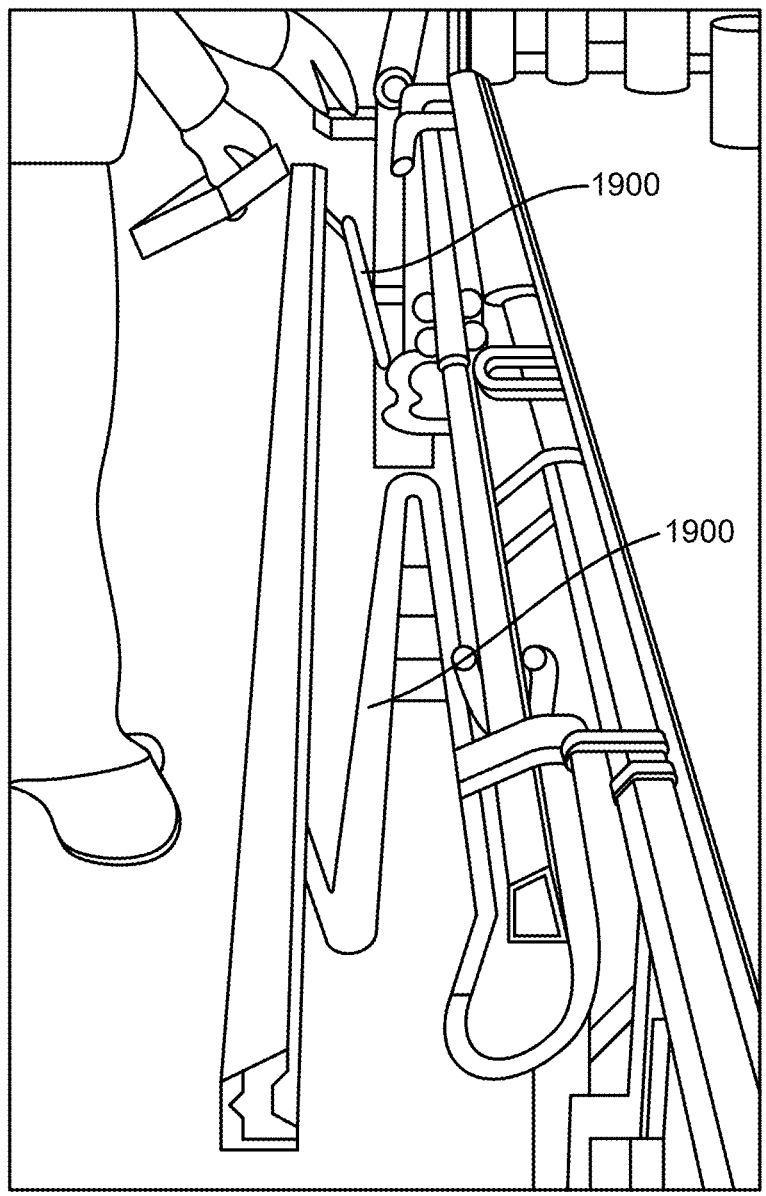
FIG. 19 shows one embodiment of extendable legs that may deploy or withdraw the sunshade or solar cell of the current disclosure.
Figure 20:
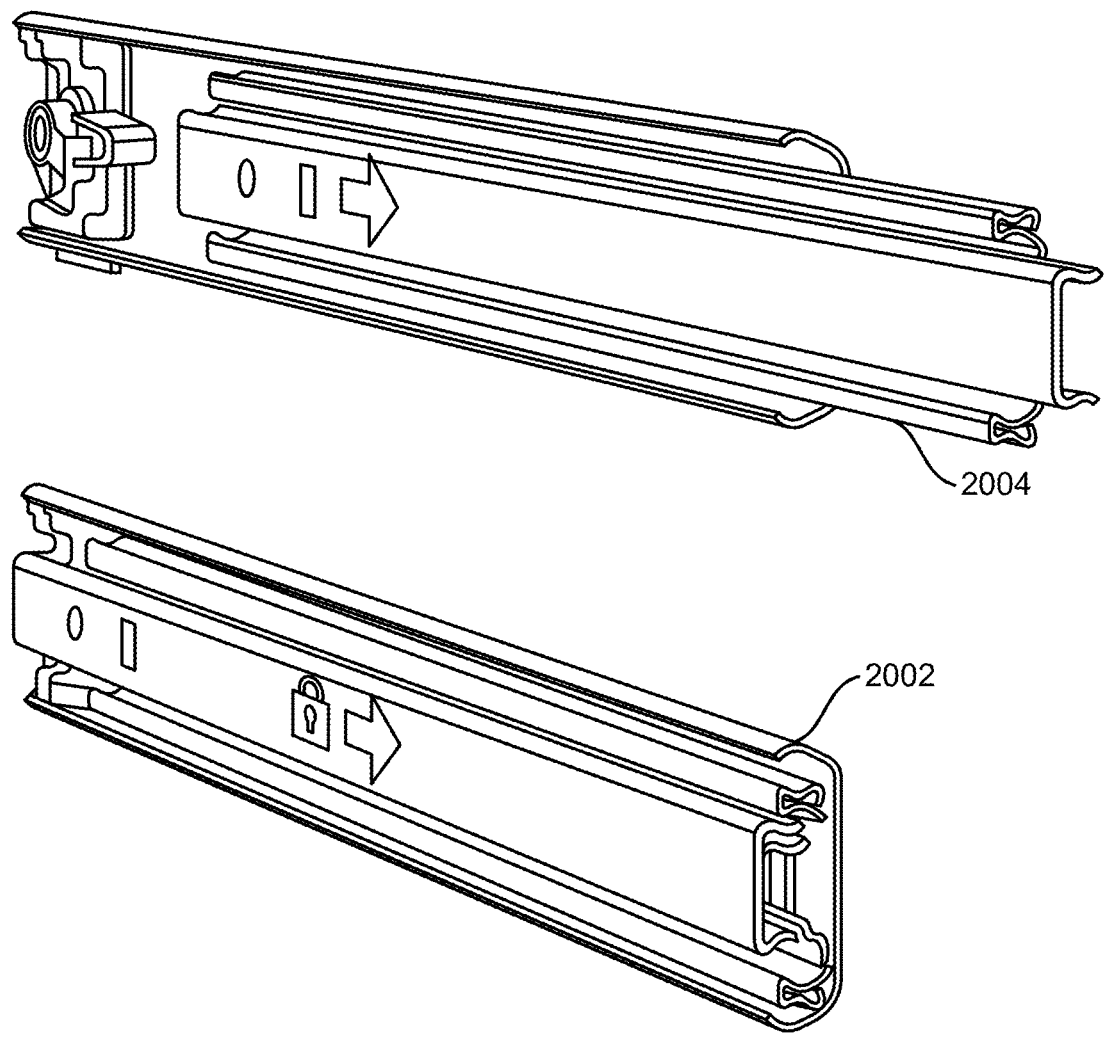
FIG. 20 shows one embodiment of nested rails that may be employed with the current disclosure.

FIG. 7 also shows that alternative open boom clamp 200 may have a roll bracket 222 attached. Roll bracket 222 may be attached, via bolts or other methods known to those of skill in the art, one or more sliding locks 206. Roll bracket 222 may comprise a frame 224 supporting a roller 226. A sunshade or flexible cell 228 may be rolled onto roller 226 and extended either manually, such as pulling the sunshade away from roll bracket 222 and rerolling the shade or solar cell manually, or automatically, via spring tension, motorized controls, etc., and may be affixed to the vessel or another surface via an attachment mechanism 232 that may comprise a hook, loop, tie down, etc., as known to those of skill in the art. FIG. 18 shows one examples of a roller 226 that may be used as part of the disclosure, which may include slotted end brackets 1802, tension adjuster 1804, supporting tube 1806, spring support 1808, and spring 1810. Other embodiments could include "scissoring legs" 1900, see FIG. 19 to extend and retract sunshade or flexible cell 228. Legs 1900 may be hinged, tensioned, spring coiled, etc., as known to those of skill in the art to effectuate movement of sunshade or flexible cell 228. Roll bracket 222 may also support a telescoping bracket 230. Telescoping bracket 230 allows for horizontal movement of roll bracket 222 with respect to clamp 100 or alternative clamp 200 and vessel boom 114 in order to allow for precise, specific shade or solar cell locations. Telescoping bracket 230 may be a ball bearing-based system comprised of nested rail elements that extended with respect to one another to allow for horizontal movement of roll bracket 222 within the vessel with respect to clamp 100 or alternative clamp 200 and boom 114. In one embodiment, the current disclosure may include an adjustable tension loaded spring roller system similar to a residential pull down blind for windows. A motorized model may also be provided which may be operated by lightweight folding arm frame driven by nylon straps or similar materials, cable, or a bicycle-type chain and may be remotely operated via a remote or other means. Telescoping bracket 230 may comprise two or more mating pieces depending on the desired size and length of the bracket vis-à-vis the vessel or location where it is need. A bracket profile may attach between a solar cell unit and the clamp. Ball bearings or nylon rollers allow the parts to move smoothly past one another to telescope outward to the stern of the vessel to full cover the cockpit area. FIG. 20 shows one embodiment of a telescoping bracket that may be employed for the current disclosure retracted 2002 and extended 2004.

Figure 8:
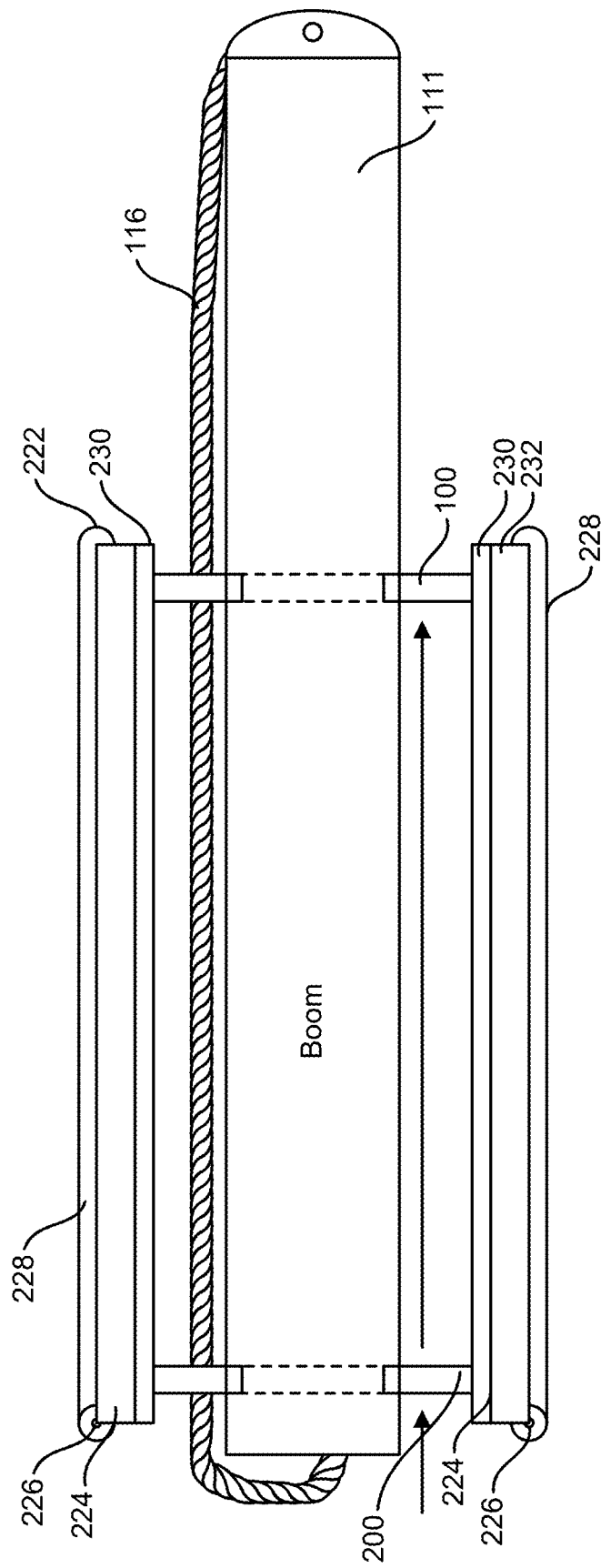
FIG. 8 shows a top down view of one embodiment of the current disclosure in place on a boom.

FIG. 8 shows a top down view of one embodiment of the current invention showing two sets of either open profile boom clamp 100 and/or alternative boom clamp 200 affixed to a boom with both clamps supporting roll bracket 222 and its associated paraphernalia, including sun shade/solar cell 228. FIG. 8 also shows how clamps 100 and 200 do not completely encircle the boom and due to their respective clamp passages 108, allow rope 116 and other rigging, lines, etc., to still function. This allows the user to fully control the vessel unimpeded, even with sunshade/solar cell 228 rolled up or deployed.

Figure 9:
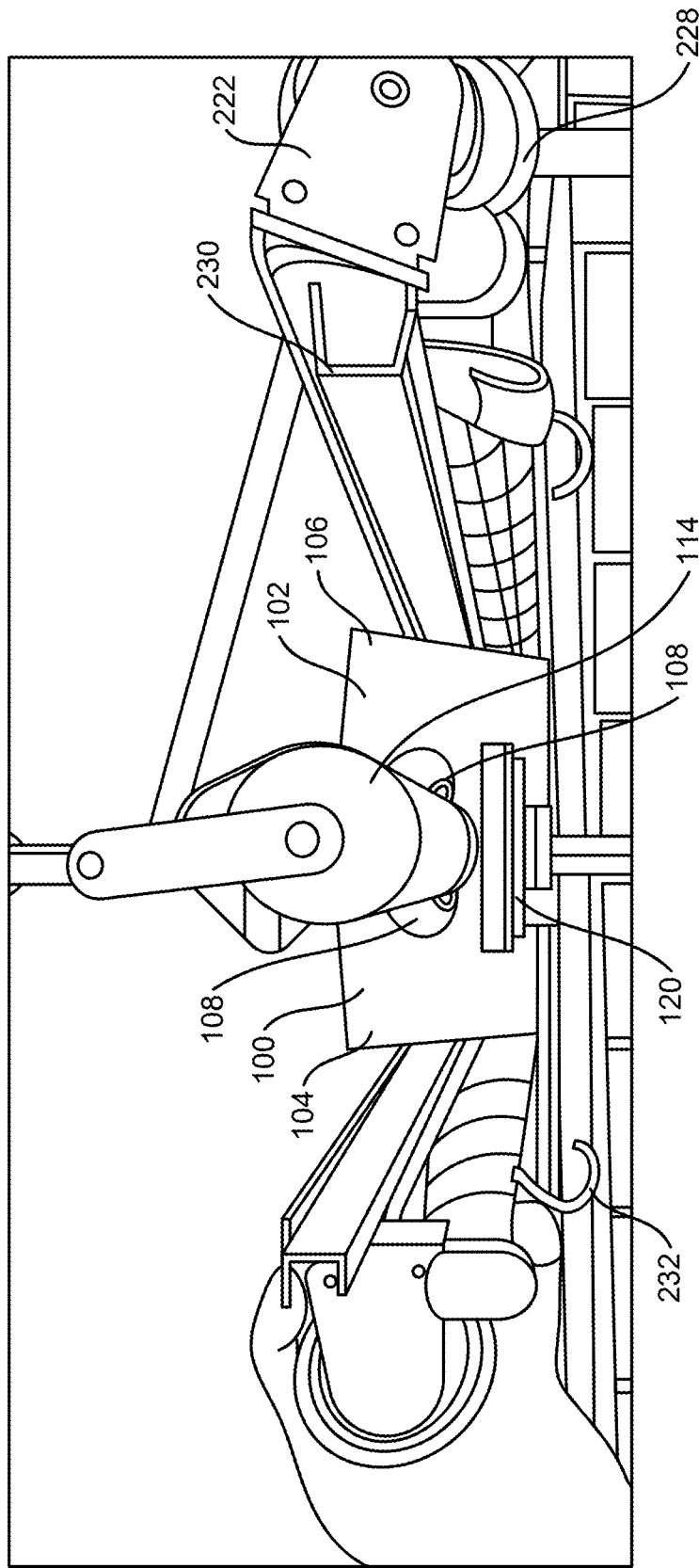
FIG. 9 shows an end-on photo of one embodiment of the current disclosure.
Figure 10:
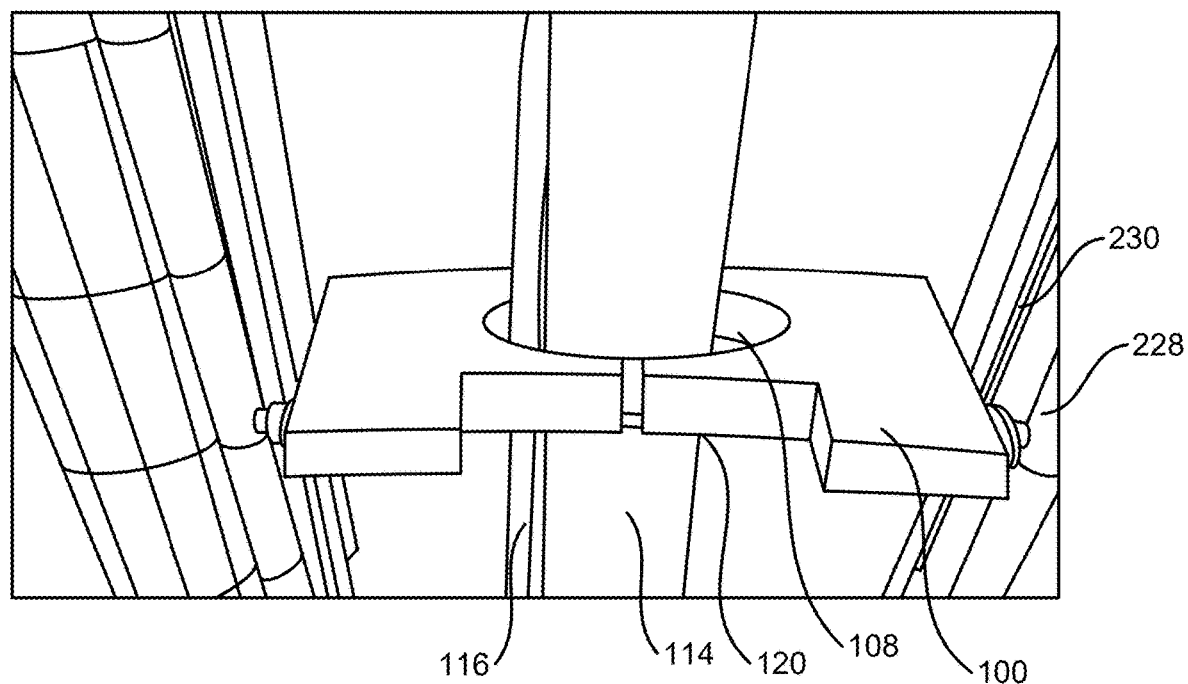
FIG. 10 shows a close-up underside photo of one embodiment of the current disclosure.
Figure 11:
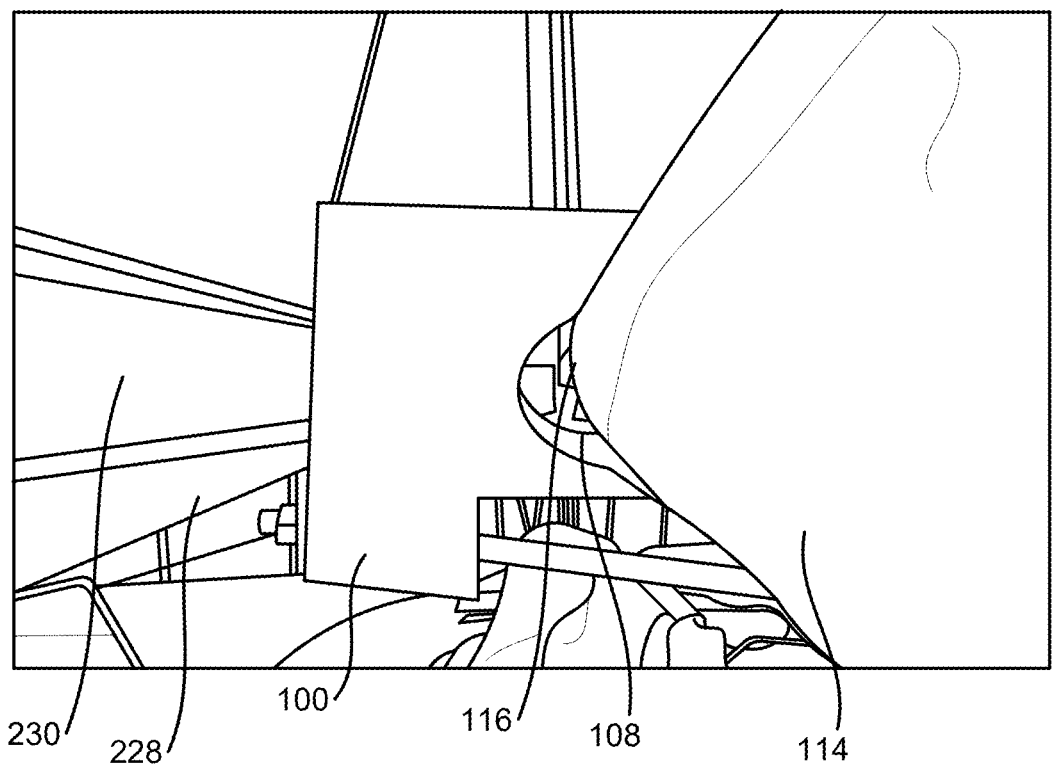
FIG. 11 shows a close-up photo of one embodiment of the current disclosure.
Figure 12:
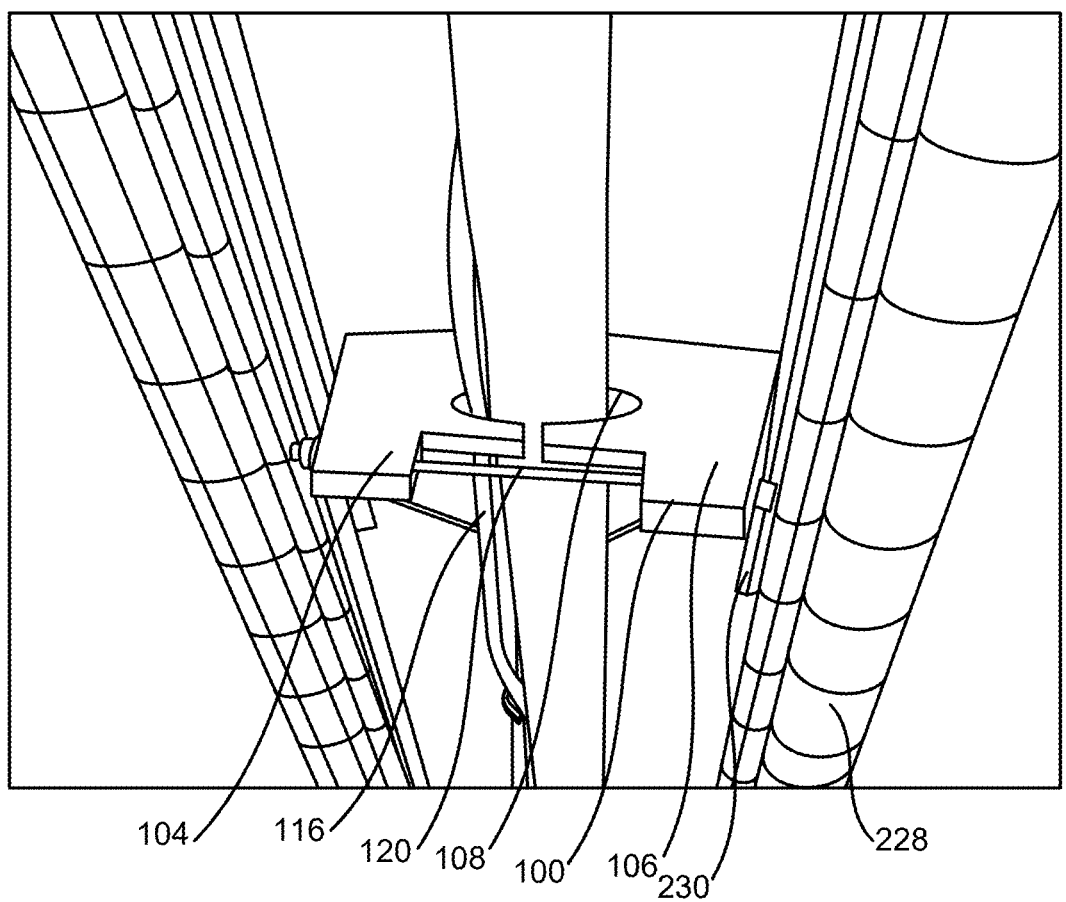
FIG. 12 shows a further underside photo of one embodiment of the current disclosure.
Figure 13:
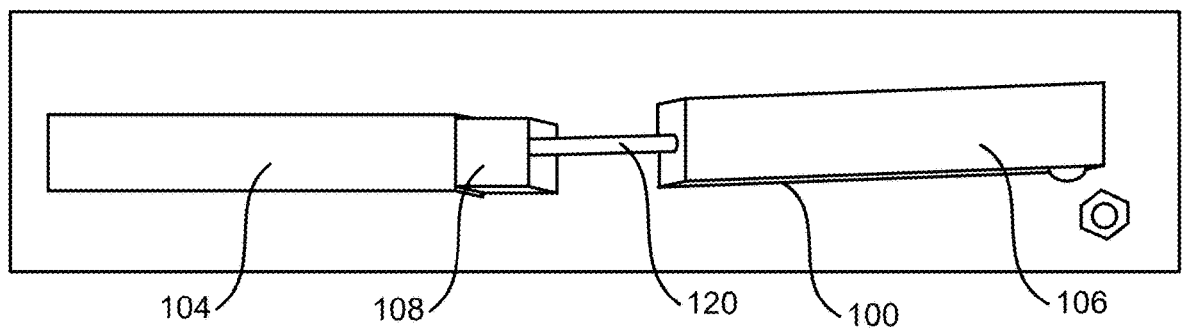
FIG. 13 shows a top down photo of one embodiment of a clamp of the current disclosure.
Figure 14:
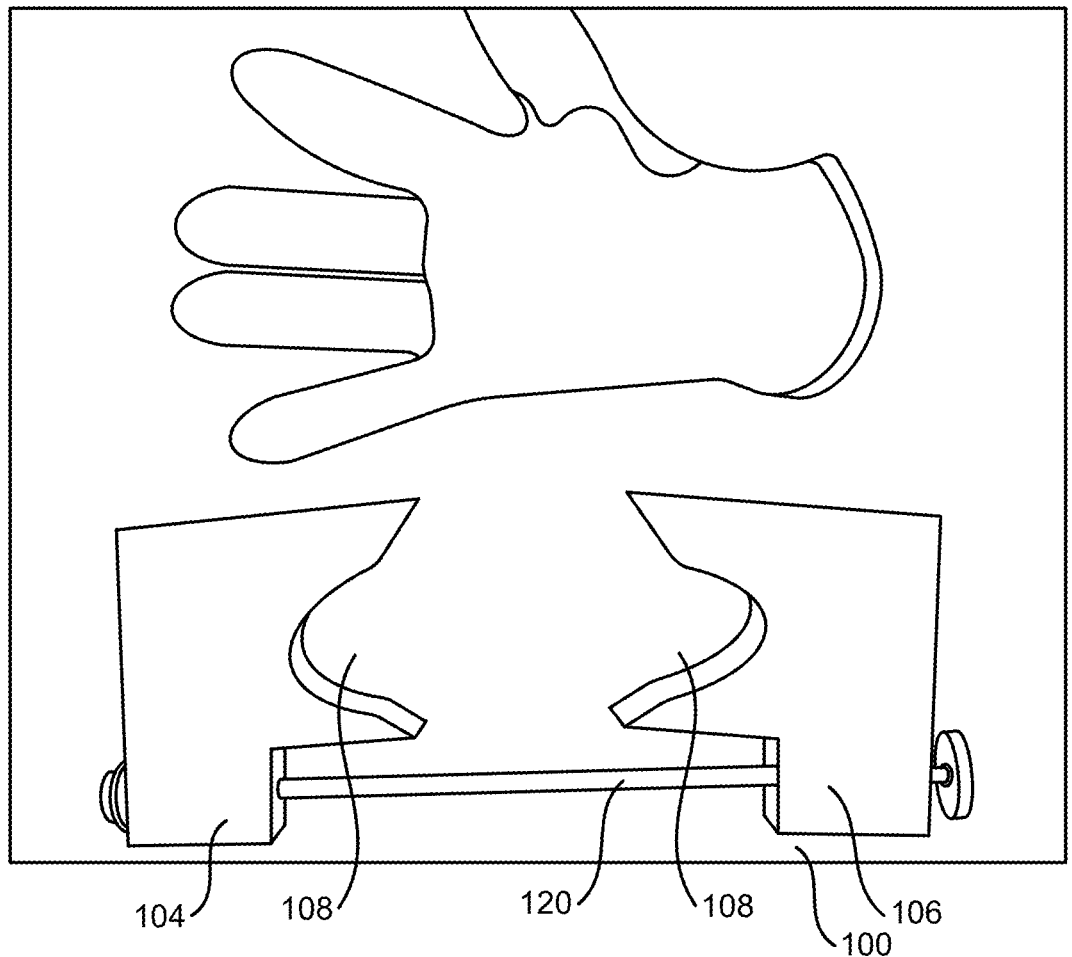
FIG. 14 shows a front-on photo of one embodiment of a clamp of the current disclosure with a glove shown for relative scale.
Figure 15:
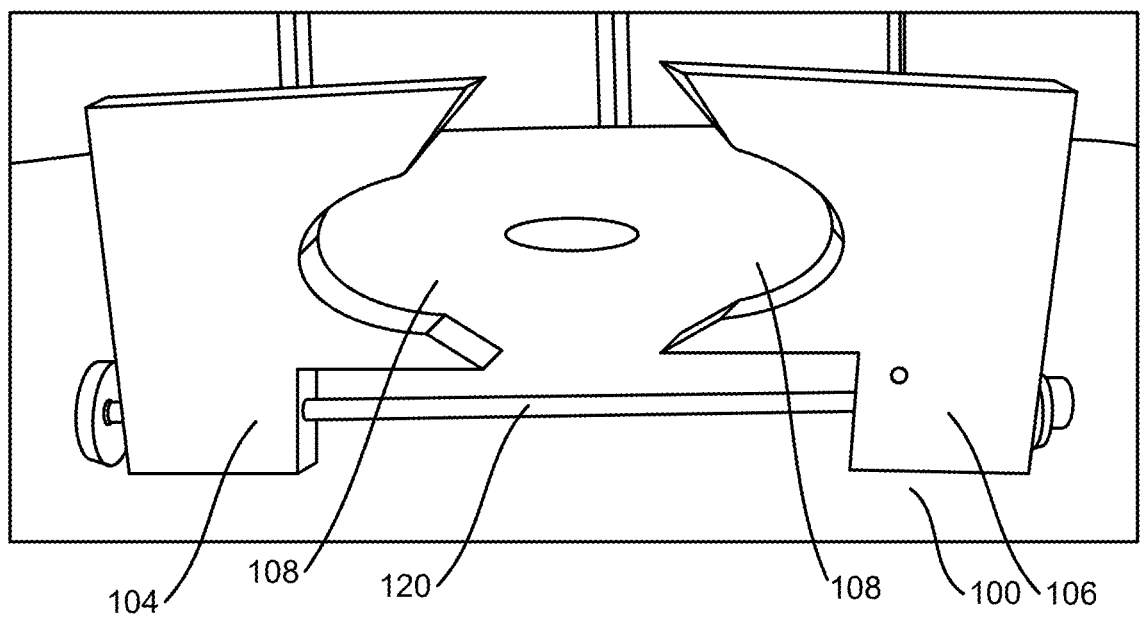
FIG. 15 shows a front-on photo of one embodiment of a clamp of the current disclosure.
Figure 16:
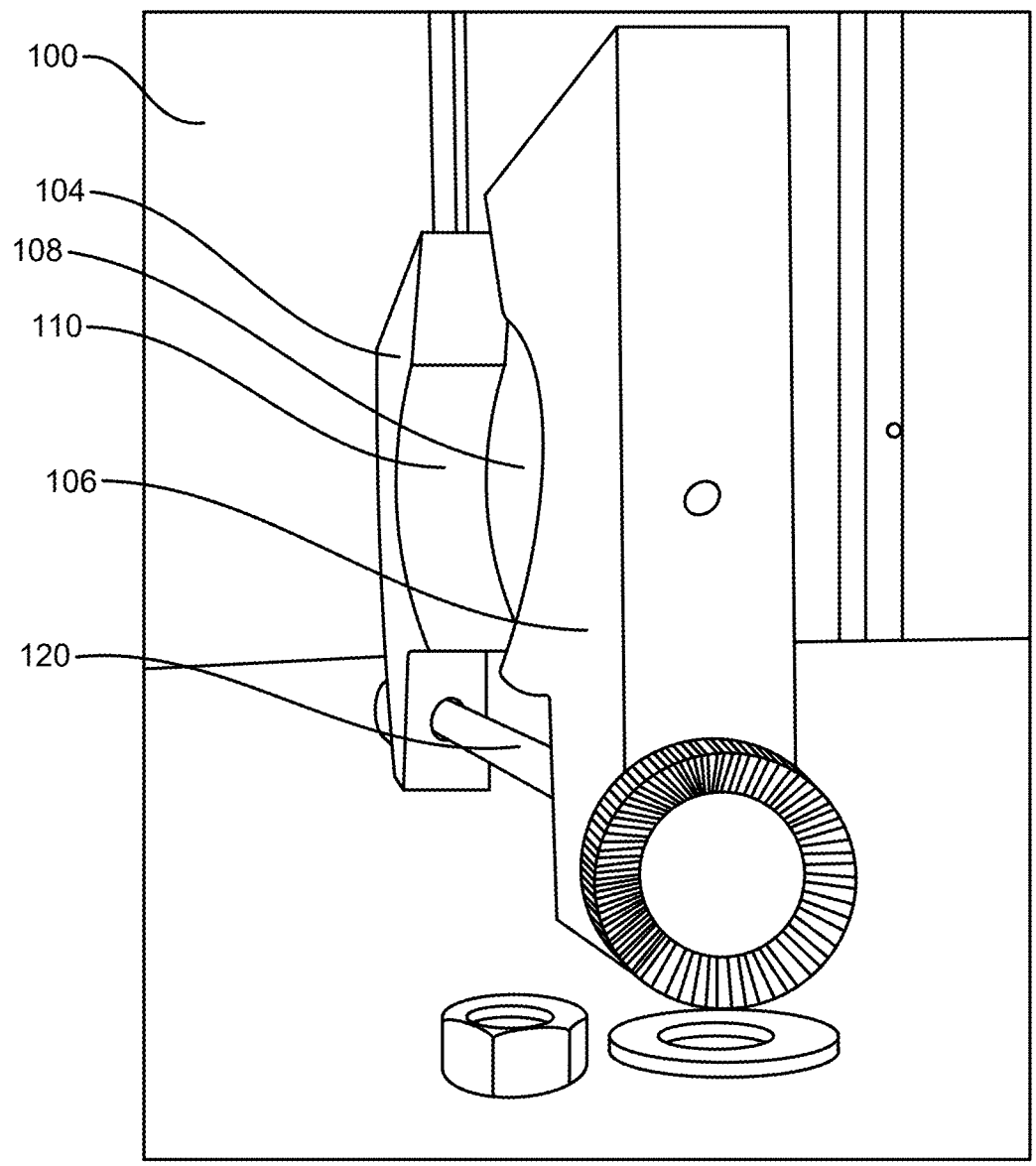
FIG. 16 shows an angled side view photo of one embodiment of a clamp of the current disclosure.

FIG. 9 shows a photogram of an extendable releasably affixed shade apparatus of the current disclosure.

In one embodiment, a device of the current disclosure may be assembled by bolting the rolled solar cell units to the telescoping rail brackets. Next, the telescoping rail brackets may be bolted to clamp brackets. Further, the bracket portions may be connected together by inserting a tightening bolt with washer and nut. Now the unit is ready for installation, wherein one simply lifts the unit up to and onto the boom and closes the clamps "jaws" to bite onto the boom via tightening the hand bolt. To remove, one simply loosens the hand bolt and the clamp will release its bite.

Figure 21:
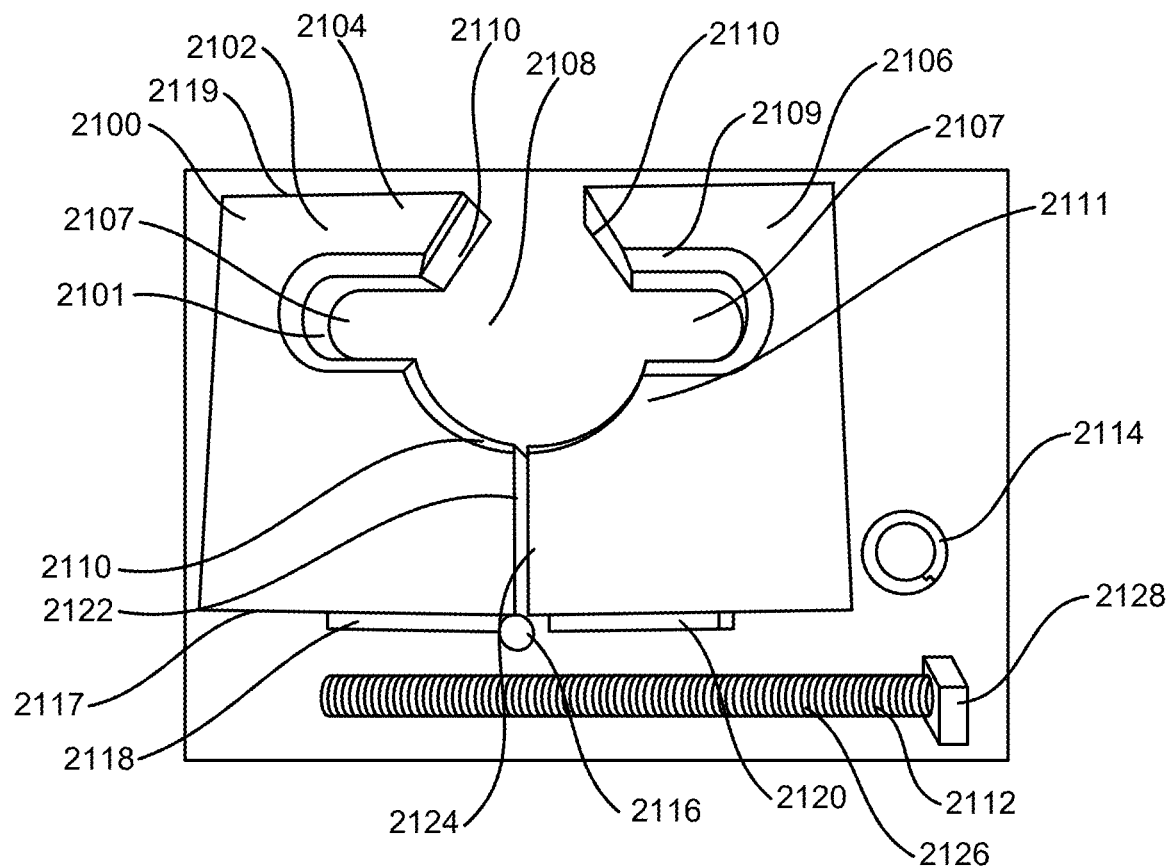
FIG. 21 shows a photograph of one embodiment of an improved clamp of the current disclosure.

FIG. 21 shows an improved clamp 2100 of the present disclosure. Improved clamp 2100 may include improved clamp body, that may be made from metals, synthetics, and/or high density plastics. In one embodiment, 6061 grade aluminum alloy due to its corrosion resistant characteristics. Improved clamp 2100 may include improved clamp first clamping portion 2104 and improved clamp second clamping portion 2106, these may work together to define improved clamp passage 2108, which can allow rigging or other accoutrements, not shown, to pass through improved clamp passage side passages 2107, defined in improved clamp body 2102 as extensions or protrusions from clamp passage 2108 and may be entirely defined within first clamping portion 2104 and second clamping portion 2106, respectively, to remain open and unobstructed when improved clamp 2100 is affixed in place or clamped together to form a passage way or channel for rigging, cabling, etc., which may be exist on a boat, structure or other vessel, while not being "pinched" or otherwise hindered by improved clamp 2100. Further, improved clamp passage 2108 may define inner perimeter border 2109, which may completely or partially defines the perimeter of clamp passage 2108 or may completely or partially define the perimeter of side passages 2107, which is sloped inward toward the interior of improved clamp 2100 away from improved clamp face 2111, to prevent forming a 90 degree, or other harmful angle as known to those of skill in the art at the clamp face 2111, that may engage and fray or otherwise damage lines, rigging, wiring, etc., that pass through improved clamp passage 2108. Inner perimeter border 2109 being angled inward with respect to clamp face 2111 also allows for easier insertion of lines, wiring, rigging, etc., through improved clamp 2100 when already secured to a boom or other structure given the "funnel" shape created by inner perimeter border 2109. Improved clamp 2100 may also include various improved clamp compression units 2110 on improved clamp inner surface 2101 that may be made from contouring, low density, open cell foam rubber and serve to protect the boom from being scraped or damaged by affixing improved clamp 2100 to the boom, not shown. Improved clamp 2100 may be tightened by inserting improved clamp retainer 2112 through retainer opening 2200, see FIG. 22. Retainer opening 2200 may include frictional surface feature(s) 2202, such as threading, on retainer interior 2204 that may frictionally or otherwise engage with improved clamp retainer 2112 via treading or other features on retainer outer surface 2126, such features providing male/female engagement, to pull improved first clamping portion 2104 close to or adjacent improved second clamping portion 2106 and to allow for release of first clamping portion 2104 and second clamping portion 2106 from one another by pushing them apart from one another. An improved clamp securement device 2114, which in one instance may be a lock washer, may be placed between improved retainer head 2128 and improved second clamping portion 2106 to secure improved clamp retainer 2112 in place when tightened to secure improved clamp retainer 2112 to a boom or other structure. Improved clamp 2100 may also be formed to be reversibly separable and/or movable between open configuration 2302, see FIG. 23, and closed configuration 2400, see FIG. 24, via improved clamp hinge 2116 that may include improved clamp hinge first section 2118 and improved clamp hinge second section 2120 that allows improved clamp 2100 to open and close in a "clam shell" or "Pac-Man®" manner to allow improved clamp 2100 to fit around booms or other structures via forming and then decreasing space between improved clamp first joining surface 2122 and improved clamp second joining surface 2124. While shown affixed to bottom 2117 of improved clamp 2100, the current disclosure is not so limited and improved clamp hinge 2116 may be affixed to top 2119 of improved clamp 2100 as well.

Figure 22:
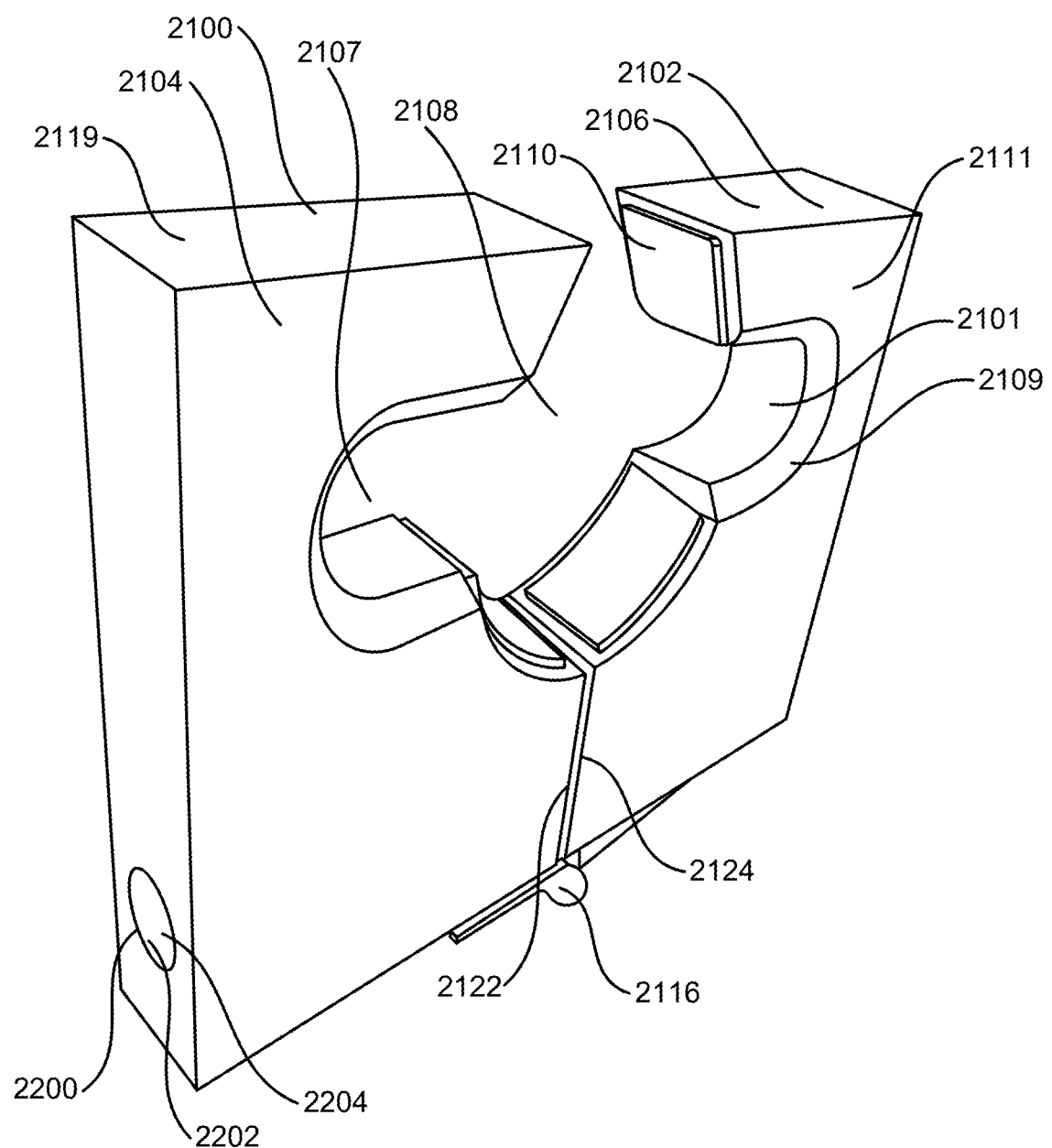
FIG. 22 shows an alternate view of a photograph an improved clamp of the current disclosure.
Figure 23:
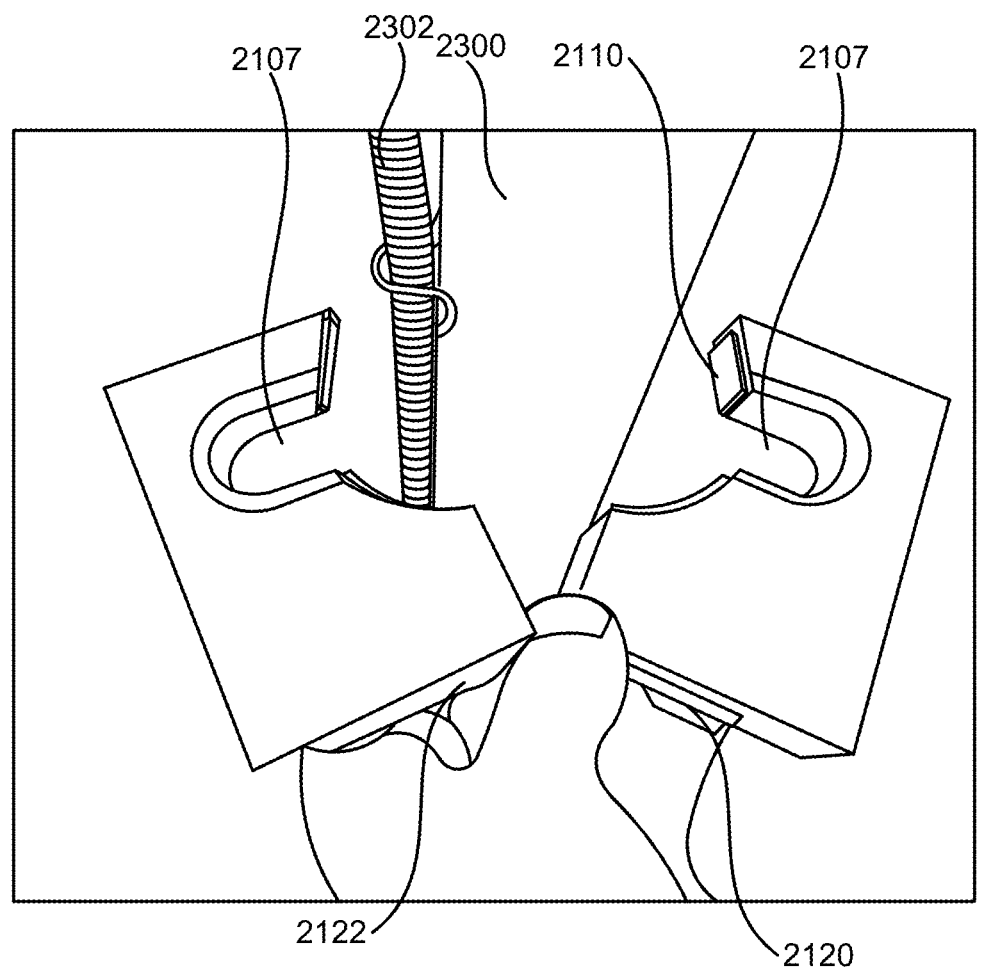
FIG. 23 shows a photograph an improved clamp being placed around a boom.
Figure 24:
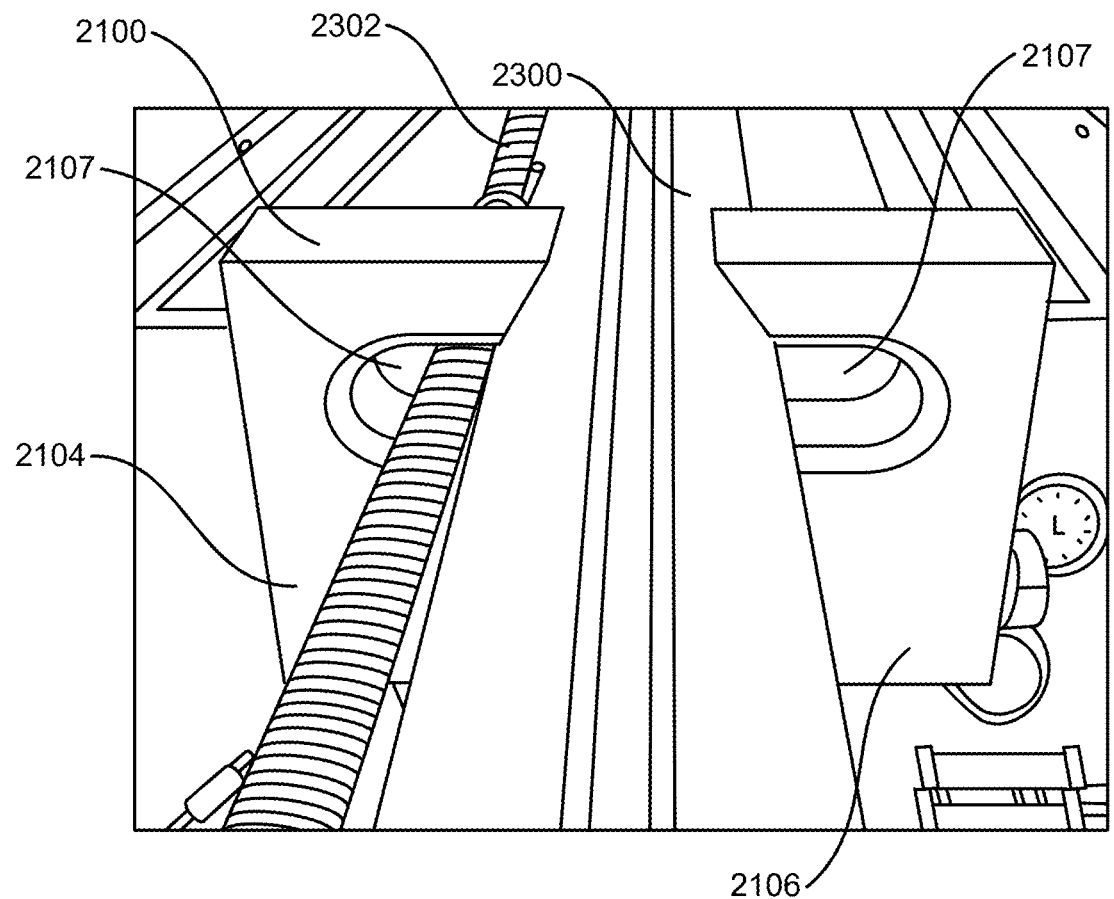
FIG. 24 shows a photograph of an improved claim fastened around a boom with rigging passing through the improved clamp.
Figure 25:
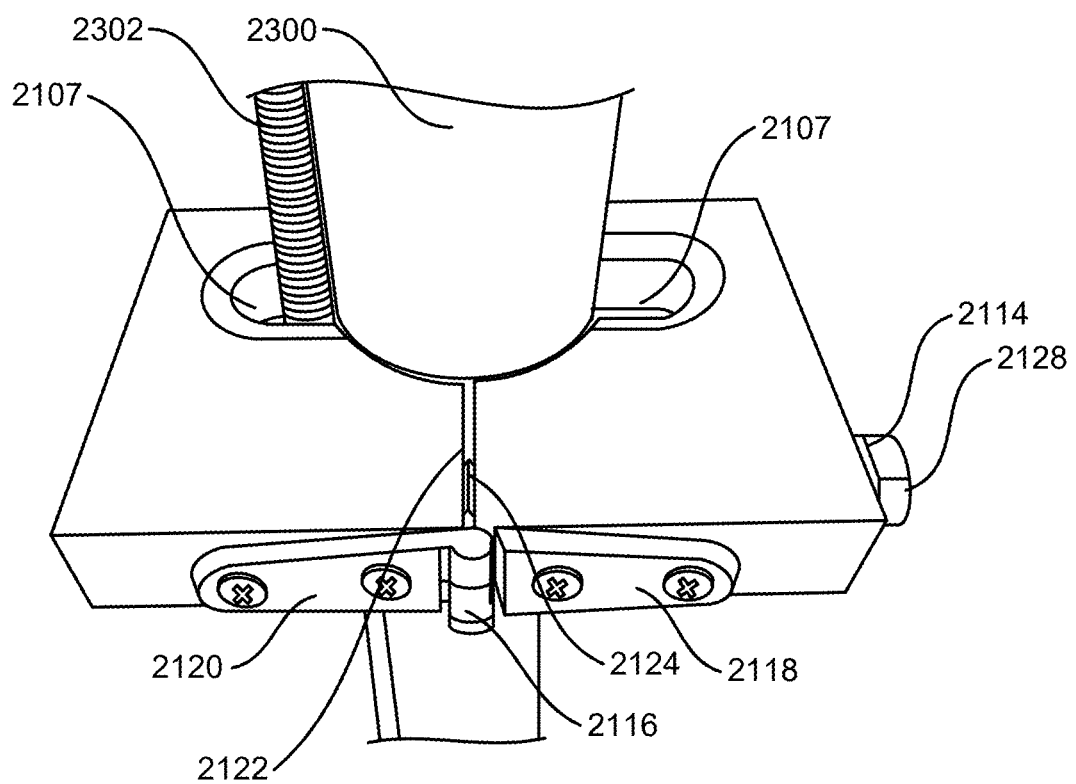
FIG. 25 shows a photograph of a different view the improved clamp affixed to a boom as shown in FIG. 24.

FIG. 22 shows an alternate view of a photograph an improved clamp of the current disclosure showing retainer opening 2200, frictional surface feature 2202 and retainer interior 2204. FIG. 23 shows a photograph an improved clamp 2100 in open configuration 2304 being placed around a boom 2300 and rigging line 2302. FIG. 24 shows a photograph of an improved clamp fastened around a boom in closed configuration 2400 with rigging passing through the improved clamp. FIG. 25 shows a photograph of a different view the improved clamp affixed to a boom as shown in FIG. 24.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A non-interfering clamp comprising:
   a clamp body comprising a first clamping portion and a second clamping portion; the first clamping portion and second clamping portion each combining to define a clamp passage within the clamp body;
   the non-interfering clamp configured to have an open configuration and a closed configuration and to reversibly move between the open configuration and the closed configuration via separating the first clamping portion and second clamping portion from one another and rejoining the first clamping portion and the second clamping portion; and
   the clamp body defining an opening for insertion of a clamp retainer configured to cause the first clamping portion and the second clamping portion to move toward one another and tighten into the closed configuration; and
   an inner perimeter angled inward with respect to a clamp face of the improved clamp body at least partially surrounding an at least one side passage.

2. The non-interfering clamp of claim 1, further comprising wherein the clamp passage defines the at least one side passage defined from the clamp passage.

3. The non-interfering clamp of claim 2, further comprising wherein when the non-interfering clamp is engaged with a structure, the at least one side passage remains open and unobstructed.

4. The non-interfering clamp of claim 1, further comprising at least one clamp compression unit on an inner surface of the non-interfering clamp.

5. The non-interfering clamp of claim 1, further comprising at least one hinge joining the first clamping portion to the second clamping portion.

6. The non-interfering clamp of claim 1, further comprising wherein the non-interfering clamp is affixed to a boom of a vessel.

7. The non-interfering clamp of claim 6, further comprising wherein rigging passes through the at least one side passage of the non-interfering clamp.

8. A method for affixing a non-interfering clamp to a boat structure comprising:
   placing a non-interfering clamp adjacent to a boom on a boat in an open configuration;
   the non-interfering clamp defining:
   a clamp body comprising a first clamping portion and a second clamping portion;
   the first clamping portion and second clamping portion each combining to define a clamp passage within the clamp body;
   the non-interfering clamp configured to have the open configuration and a closed configuration and to reversibly move between the open configuration and the closed configuration via separating the first clamping portion and second clamping portion from one another and rejoining the first clamping portion and the second clamping portion; and the clamp body defining an opening for insertion of a clamp retainer configured to cause the first clamping portion and the second clamping portion to move toward one another and tighten into the closed configuration;
   securing the first clamping portion and the second clamping portion around the boom by closing the clamp passage around the boom to put the clamp in the closed configuration; and tightening the first clamping portion and the second clamping portion to the boom; and
   defining an inner perimeter angled inward with respect to a clamp face of the improved clamp body to at least partially surround at at least one side passage.

9. The method for affixing a non-interfering clamp to a boat structure of claim 8, further comprising engaging rigging within the at least one side passage defined from the clamp passage.

10. The method for affixing a non-interfering clamp to a boat structure of claim 9, further comprising defining the at least one side passage to remain open and unobstructed when the non-interfering clamp is engaged with the boom.

11. The method for affixing a non-interfering clamp to a boat structure of claim 8, further comprising engaging the boom with at least one clamp compression unit defined on an inner surface of the non-interfering clamp.

12. The method for affixing a non-interfering clamp to a boat structure of claim 8, further comprising configuring the non-interfering clamp to have at least one hinge joining the first clamping portion to the second clamping portion.

13. A non-interfering clamp comprising:
    a clamp body comprising a first clamping portion and a second clamping portion; the first clamping portion and second clamping portion each combining to define a clamp passage within the clamp body;
    the non-interfering clamp configured to have an open configuration and a closed configuration and to reversibly move between the open configuration and the closed configuration via separating the first clamping portion and second clamping portion from one another and rejoining the first clamping portion and the second clamping portion; and
    the clamp body defining an opening for insertion of a clamp retainer configured to cause the first clamping portion and the second clamping portion to move toward one another and tighten into the closed configuration;
    wherein the non-interfering clamp is affixed to a boom of a vessel and rigging passes through an at least one side passage of the non-interfering clamp.

14. The non-interfering clamp of claim 13, further comprising wherein the clamp passage defines the at least one side passage defined from the clamp passage.

15. The non-interfering clamp of claim 14, further comprising wherein when the non-interfering clamp is engaged with a structure, the at least one side passage remains open and unobstructed.

16. The non-interfering clamp of claim 13, further comprising at least one clamp compression unit on an inner surface of the non-interfering clamp.

17. The non-interfering clamp of claim 13, further comprising at least one hinge joining the first clamping portion to the second clamping portion.

18. The non-interfering clamp of claim 13, further comprising an inner perimeter angled inward with respect to a clamp face of the improved clamp body at least partially surrounding the at least one side passage.

* * * * *